United States Patent
Asenjo et al.

(10) Patent No.: US 10,026,049 B2
(45) Date of Patent: Jul. 17, 2018

(54) RISK ASSESSMENT FOR INDUSTRIAL SYSTEMS USING BIG DATA

(71) Applicant: Rockwell Automation Technologies, Inc., Mayfield Heights, OH (US)

(72) Inventors: Juan L. Asenjo, Timberlake, OH (US); John Strohmenger, Strongsville, OH (US); Stephen Thomas Nawalaniec, Southlake, TX (US); Bradford Henry Hegrat, Montville, OH (US); Joseph A. Harkulich, Willoughby, OH (US); Jessica Lin Korpela, Milwaukee, WI (US); Jenifer Rydberg Wright, Renton, WA (US); Rainer Hessmer, Rancho Santa Margarita, CA (US); John Dyck, Chardon, OH (US); Edward Alan Hill, Chagrin Falls, OH (US); Salvatore T. Conti, Olmsted Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 300 days.

(21) Appl. No.: 14/087,821

(22) Filed: Nov. 22, 2013

(65) Prior Publication Data
US 2014/0337086 A1 Nov. 13, 2014

Related U.S. Application Data

(60) Provisional application No. 61/821,639, filed on May 9, 2013.

(51) Int. Cl.
*G06Q 10/06* (2012.01)
*G06F 3/06* (2006.01)
*H04L 12/24* (2006.01)

(52) U.S. Cl.
CPC ....... *G06Q 10/0635* (2013.01); *G06F 3/0635* (2013.01); *G06Q 10/06* (2013.01); *H04L 41/0896* (2013.01); *Y02P 90/86* (2015.11)

(58) Field of Classification Search
CPC .................................................. G06Q 10/0635
See application file for complete search history.

(56) References Cited

U.S. PATENT DOCUMENTS

| | | | |
|---|---|---|---|
| 5,014,317 A | 5/1991 | Kita et al. |
| 5,112,948 A | 6/1992 | Zapolin |
| (Continued) | | |

FOREIGN PATENT DOCUMENTS

| | | |
|---|---|---|
| CN | 101114160 | 1/2008 |
| CN | 101536002 | 9/2009 |
| (Continued) | | |

OTHER PUBLICATIONS

Office Action for U.S. Appl. No. 13/725,660 dated Aug. 18, 2015, 90 pgs.
(Continued)

*Primary Examiner* — Anita Coupe
*Assistant Examiner* — Crystol Stewart
(74) *Attorney, Agent, or Firm* — Amin, Turocy & Watson, LLP

(57) ABSTRACT

A cloud-based risk assessment service collects industrial data from multiple relevant and connected sources for storage and analysis on a cloud platform. The service analyzes gathered data from internal and external sources and customers across different industries to identify operational trends as a function of industry type, application type, equipment in use, device configurations, and other such variables. Based on the analysis, the risk assessment service identifies risk factors inherent in a customer's particular industrial enterprise. The cloud-based system generates a
(Continued)

risk profile for the customer that identifies the determined risks and recommends risk aversion strategies based on the customer's specific profile, compared to industry standards, product information, internal business expectations, external regulatory bodies, and/or past performance. Risk profiles are tailored for both plant-level users and business-level users to provide intelligent strategies to improve performance and prevent avoidable losses.

20 Claims, 21 Drawing Sheets

(56) References Cited

U.S. PATENT DOCUMENTS

| | | | |
|---|---|---|---|
| 5,199,009 | A | 3/1993 | Svast |
| 5,611,059 | A | 3/1997 | Benton et al. |
| 5,612,869 | A | 3/1997 | Letzt et al. |
| 5,682,460 | A | 10/1997 | Hyziak et al. |
| 5,710,885 | A | 1/1998 | Bondi |
| 5,844,794 | A | 12/1998 | Keeley |
| 5,845,149 | A | 12/1998 | Husted et al. |
| 5,856,931 | A | 1/1999 | McCasland |
| 5,978,568 | A | 11/1999 | Abraham et al. |
| 6,167,337 | A | 12/2000 | Haack |
| 6,175,770 | B1 | 1/2001 | Bladow |
| 6,175,801 | B1 | 1/2001 | Millington |
| 6,199,068 | B1 | 3/2001 | Carpenter |
| 6,279,113 | B1 | 8/2001 | Vaidya |
| 6,282,455 | B1 | 8/2001 | Engdahl |
| 6,324,607 | B1 | 11/2001 | Korowitz et al. |
| 6,381,502 | B1 | 4/2002 | Rudder et al. |
| 6,400,996 | B1 | 6/2002 | Hoffberg et al. |
| 6,412,032 | B1 | 6/2002 | Neet et al. |
| 6,437,692 | B1 | 8/2002 | Petite et al. |
| 6,457,024 | B1 | 9/2002 | Felsentein et al. |
| 6,463,338 | B1 | 10/2002 | Neet |
| 6,535,926 | B1 | 3/2003 | Esker |
| 6,578,005 | B1 | 6/2003 | Lesaint et al. |
| 6,624,388 | B1 | 9/2003 | Blankenship et al. |
| 6,640,145 | B2 | 10/2003 | Hoffberg et al. |
| 6,651,062 | B2 | 11/2003 | Ghannam et al. |
| 6,675,226 | B1 | 1/2004 | Nair et al. |
| 6,686,838 | B1 | 2/2004 | Rezvani et al. |
| 6,691,159 | B1 | 2/2004 | Grewal et al. |
| 6,705,229 | B2 | 3/2004 | Frankenberger |
| 6,708,074 | B1 | 3/2004 | Chi et al. |
| 6,708,385 | B1 | 3/2004 | Lemelson |
| 6,714,974 | B1 | 3/2004 | Machida |
| 6,728,262 | B1 | 4/2004 | Woram |
| 6,732,165 | B1 | 5/2004 | Jennings, III |
| 6,732,191 | B1 | 5/2004 | Baker et al. |
| 6,774,598 | B1 | 8/2004 | Kohler |
| 6,801,920 | B1 | 10/2004 | Wischinski |
| 6,819,960 | B1 | 11/2004 | McKelvey et al. |
| 6,891,850 | B1 | 5/2005 | Vandesteeg et al. |
| 6,895,532 | B2 | 5/2005 | Raynham |
| 6,904,600 | B1 | 6/2005 | James et al. |
| 6,907,302 | B2 | 6/2005 | Karbassi |
| 6,920,502 | B2 | 7/2005 | Araujo et al. |
| 6,952,680 | B1 * | 10/2005 | Melby .................. G06Q 10/04 705/1.1 |
| 6,965,802 | B2 | 11/2005 | Sexton |
| 6,968,242 | B1 | 11/2005 | Hwu et al. |
| 6,970,913 | B1 | 11/2005 | Albert et al. |
| 6,982,953 | B1 | 1/2006 | Swales |
| 7,032,045 | B2 | 4/2006 | Kostadinov |
| 7,085,814 | B1 | 8/2006 | Gandhi et al. |
| 7,103,428 | B2 | 9/2006 | Varone et al. |
| 7,133,900 | B1 | 11/2006 | Szeto |
| 7,149,792 | B1 | 12/2006 | Hansen et al. |
| 7,151,966 | B1 | 12/2006 | Baier et al. |
| 7,203,560 | B1 | 4/2007 | Wylie et al. |
| 7,210,095 | B1 | 4/2007 | Mor |
| 7,233,830 | B1 | 6/2007 | Callaghan et al. |
| 7,242,009 | B1 | 7/2007 | Wilson et al. |
| 7,275,037 | B2 | 9/2007 | Lauer |
| 7,277,865 | B1 | 10/2007 | Silverstone et al. |
| 7,289,994 | B2 | 10/2007 | Nixon et al. |
| 7,298,275 | B2 | 11/2007 | Brandt et al. |
| 7,310,344 | B1 | 12/2007 | Sue |
| 7,383,155 | B2 * | 6/2008 | Rosam .................. G06Q 10/06 702/179 |
| 7,412,548 | B2 | 8/2008 | Sichner |
| 7,478,010 | B2 | 1/2009 | Hashemian |
| 7,480,728 | B2 | 1/2009 | Evans |
| 7,539,724 | B1 | 5/2009 | Callaghan |
| 7,734,590 | B2 | 6/2010 | Chand et al. |
| 8,150,959 | B1 | 4/2012 | Bezdicek et al. |
| 8,266,066 | B1 | 9/2012 | Wezter et al. |
| 8,353,012 | B2 | 1/2013 | Del Real |
| 8,392,845 | B2 | 3/2013 | Cahill et al. |
| 8,451,753 | B2 | 5/2013 | Vanga et al. |
| 8,468,272 | B2 | 6/2013 | Giroti |
| 8,686,871 | B2 | 4/2014 | Jensen et al. |
| 8,924,328 | B1 | 12/2014 | Kozlovsky et al. |
| 9,024,955 | B2 | 5/2015 | Ramarao et al. |
| 9,117,076 | B2 * | 8/2015 | Devost .................. G06F 21/56 |
| 9,438,648 | B2 | 9/2016 | Asenjo et al. |
| 9,507,807 | B1 | 11/2016 | Florissi et al. |
| 9,690,669 | B2 | 6/2017 | Bernal et al. |
| 2002/0004798 | A1 | 1/2002 | Babula et al. |
| 2002/0016839 | A1 | 2/2002 | Smith, Jr. |
| 2002/0042756 | A1 | 4/2002 | Kumar et al. |
| 2002/0046239 | A1 | 4/2002 | Stawikowski et al. |
| 2002/0049833 | A1 | 4/2002 | Kikinis |
| 2002/0065898 | A1 | 5/2002 | Leontiev et al. |
| 2002/0068983 | A1 | 6/2002 | Sexton |
| 2002/0068984 | A1 | 6/2002 | Alexander et al. |
| 2002/0073236 | A1 | 6/2002 | Helgeron et al. |
| 2002/0077711 | A1 | 6/2002 | Nixon et al. |
| 2002/0082966 | A1 * | 6/2002 | O'Brien ................ G06Q 10/06 705/36 R |
| 2002/0094588 | A1 | 7/2002 | Fan et al. |
| 2002/0107904 | A1 | 8/2002 | Talluri et al. |
| 2002/0138378 | A1 | 9/2002 | Leskuski |
| 2002/0156872 | A1 | 10/2002 | Brown |
| 2002/0156926 | A1 | 10/2002 | Batka |
| 2002/0161745 | A1 | 10/2002 | Call |
| 2002/0169993 | A1 | 11/2002 | Woods et al. |
| 2003/0004937 | A1 | 1/2003 | Salmenkaita et al. |
| 2003/0009253 | A1 | 1/2003 | McIntyre et al. |
| 2003/0009572 | A1 | 1/2003 | Thurner |
| 2003/0011467 | A1 | 1/2003 | Suomela |
| 2003/0014149 | A1 | 1/2003 | Kreidler et al. |
| 2003/0023336 | A1 | 1/2003 | Kreidler et al. |
| 2003/0041089 | A1 | 2/2003 | Mauro |
| 2003/0051074 | A1 | 3/2003 | Edwards |
| 2003/0056224 | A1 | 3/2003 | Stone |
| 2003/0105535 | A1 | 6/2003 | Rammler |
| 2003/0105585 | A1 | 6/2003 | Ukita |
| 2003/0109942 | A1 | 6/2003 | Yeh et al. |
| 2003/0120817 | A1 | 6/2003 | Ott et al. |
| 2003/0156639 | A1 | 8/2003 | Liang |
| 2003/0167238 | A1 | 9/2003 | Zeif |
| 2003/0167449 | A1 | 9/2003 | Warren et al. |
| 2003/0177169 | A1 | 9/2003 | Nutt et al. |
| 2003/0177201 | A1 | 9/2003 | Shen |
| 2003/0198188 | A1 | 10/2003 | Castlebury et al. |
| 2003/0208545 | A1 | 11/2003 | Eaton et al. |
| 2003/0217100 | A1 | 11/2003 | Kronk |
| 2003/0224769 | A1 | 12/2003 | Solve et al. |
| 2003/0236576 | A1 | 12/2003 | Resnick et al. |
| 2004/0083165 | A1 * | 4/2004 | Lawrence ............. G06Q 30/02 705/38 |
| 2004/0111512 | A1 | 6/2004 | Barth |
| 2004/0148039 | A1 | 7/2004 | Farchmin et al. |
| 2004/0148187 | A1 | 7/2004 | Boettcher et al. |
| 2004/0148383 | A1 | 7/2004 | Gonsalves |
| 2004/0159113 | A1 | 8/2004 | Singh et al. |
| 2004/0199573 | A1 | 10/2004 | Schwartz et al. |
| 2004/0214566 | A1 | 10/2004 | Suzuki et al. |

(56) References Cited

U.S. PATENT DOCUMENTS

| | | |
|---|---|---|
| 2004/0215551 A1* | 10/2004 | Eder .................... G06Q 40/00 705/38 |
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078862 A1 | 4/2007 | Chand et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0192213 A1 | 8/2007 | Wu et al. |
| 2007/0194097 A1* | 8/2007 | Jones .................... B25J 19/06 235/375 |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0125887 A1 | 5/2008 | Case |
| 2008/0155064 A1 | 6/2008 | Kosuge |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0263514 A1 | 10/2008 | DeMesa |
| 2009/0037872 A1 | 2/2009 | Schnabele et al. |
| 2009/0063258 A1 | 3/2009 | Mueller et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089233 A1 | 4/2009 | Gach et al. |
| 2009/0089359 A1 | 4/2009 | Siorek et al. |
| 2009/0089682 A1 | 4/2009 | Baier |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1 | 4/2010 | McGreevy et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1* | 7/2010 | Schmit .................... G06F 8/61 717/173 |
| 2010/0211509 A1 | 8/2010 | Jacobs |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin |
| 2010/0257228 A1 | 10/2010 | Staggs et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0078300 A9 | 3/2011 | Grelewicz et al. |
| 2011/0161378 A1 | 6/2011 | Williamson |
| 2011/0173127 A1 | 7/2011 | Ho et al. |
| 2011/0276498 A1* | 11/2011 | Madhok ................ G06Q 10/00 705/302 |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0101801 A1 | 4/2012 | Van Dorsselaer |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1* | 11/2012 | Holt ........................ G06Q 10/00 700/29 |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1* | 2/2013 | Hampapur ............ G06Q 10/10 705/7.12 |
| 2013/0097563 A1 | 4/2013 | Pacheco Rodrigues Velho et al. |
| 2013/0097710 A1* | 4/2013 | Basavapatna .......... H04W 4/02 726/25 |
| 2013/0104236 A1* | 4/2013 | Ray .................... H04L 63/1408 726/25 |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0212420 A1 | 8/2013 | Lawson et al. |
| 2013/0218971 A1 | 8/2013 | Sasaki et al. |
| 2013/0257627 A1* | 10/2013 | Rafael .................. G05B 19/042 340/691.6 |
| 2013/0283265 A1 | 10/2013 | Acharya et al. |
| 2013/0304237 A1 | 11/2013 | Schroeder et al. |
| 2013/0325545 A1* | 12/2013 | Mordvinova .......... G06Q 10/06 705/7.28 |
| 2014/0013100 A1 | 1/2014 | Menzel et al. |
| 2014/0046977 A1* | 2/2014 | Gopalakrishnan ...... G06F 17/28 707/776 |
| 2014/0047107 A1 | 2/2014 | Maturana et al. |
| 2014/0052499 A1 | 2/2014 | Wagner et al. |

(56) References Cited

U.S. PATENT DOCUMENTS

| | | |
|---|---|---|
| 2014/0059056 A1 | 2/2014 | Chaney et al. |
| 2014/0095654 A1* | 4/2014 | Finnerty ............... G05B 15/02 709/217 |
| 2014/0137257 A1* | 5/2014 | Martinez ............ H04L 63/1433 726/25 |
| 2014/0156032 A1 | 6/2014 | Jenkins et al. |
| 2014/0156584 A1* | 6/2014 | Motukuri ............... G06Q 10/06 706/52 |
| 2014/0279641 A1* | 9/2014 | Singh ..................... G06Q 10/06 705/325 |
| 2014/0279948 A1* | 9/2014 | Mahate ............... G06F 17/3053 707/692 |
| 2014/0306533 A1 | 10/2014 | Paquin et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0304193 A1 | 10/2015 | Ishii et al. |
| 2015/0378356 A1 | 12/2015 | Hefeeda et al. |
| 2016/0217410 A1 | 7/2016 | Santos et al. |

FOREIGN PATENT DOCUMENTS

| | | |
|---|---|---|
| CN | 101739007 | 6/2010 |
| CN | 102449567 A | 5/2012 |
| CN | 102927937 | 2/2013 |
| CN | 103019102 | 4/2013 |
| DE | 19834456 | 2/2000 |
| EP | 1209558 A2 | 5/1996 |
| EP | 1531373 A2 | 5/2005 |
| EP | 1686442 A1 | 8/2006 |
| EP | 1933214 | 6/2008 |
| EP | 2189900 A1 | 5/2010 |
| EP | 2293164 A1 | 3/2011 |
| EP | 2453326 | 5/2012 |
| EP | 2469466 A1 | 6/2012 |
| EP | 2801938 | 11/2014 |
| EP | 2801940 | 11/2014 |
| EP | 2801941 | 11/2014 |
| WO | 0111586 A | 2/2001 |
| WO | 169329 A2 | 9/2001 |
| WO | 0217131 | 2/2002 |
| WO | 03058506 A1 | 7/2003 |
| WO | 2008133715 | 11/2008 |
| WO | 2009046095 | 4/2009 |
| WO | 2011050482 | 5/2011 |
| WO | 2013007866 A1 | 1/2013 |

OTHER PUBLICATIONS

Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.

Colombo, Amando Walter, et al., "Towards the Factory of the Future: A Service-Oriented Cross-layer Infrastructure," ICT Shaping the World: A Scientific View, 2009, pp. 65-81.

Notice of Allowance for U.S. Appl. No. 13/725,578, dated Apr. 24, 2015, 23 pages.

Office Action for U.S. Appl. No. 13/677,060, dated Oct. 20, 2015, 48 pages.

Office Action for U.S. Appl. No. 13/615,195, dated Sep. 21, 2015, 19 pages.

Office Action for U.S. Appl. No. 13/725,660, dated Oct. 26, 2015, 79 pages.

Office Action dated Jan. 20, 2015 for U.S. Appl. No. 13/615,195, 22 pages.

Third Party Submission under 37 CFR 1.290 dated Nov. 21, 2014 for U.S. Appl. No. 14/087,873, 23 pages.

Office Action dated Dec. 27, 2004 for U.S. Appl. No. 10/162,315, 8 pages.

Office Action dated Jun. 15, 2005 for U.S. Appl. No. 10/162,315, 9 pages.

Office Action dated Sep. 9, 2005 for U.S. Appl. No. 10/162,315, 10 pages.

Vasudevan, A Web Services Primer, Apr. 4 2001, XML.com, http://webservices.xml.com/pub/a/ws/2001/04/04/webservices/index.html, 10 pages.

Office Action dated Mar. 6, 2006 for U.S. Appl. No. 10/162,315, 8 pages.

W3C, Web Services Description Language, http://www.w3.org/TR/wsdl, Mar. 15, 2001, 36 pages.

European Search Report dated Mar. 18, 2004 for European Patent Application Serial No. 03026339, 3 Pages.

Compuquest, Inc., SPM-IM-Instant Messaging Client for SpreadMsg Wireless Messaging Software, http://www.compuquestinc.com/spmim.html, Aug. 13, 2002, 4 pages.

Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.

International Business Machines Corporation, Cross platform instant messaging using web services, Research Disclosure, Kenneth Mason Publications, Hampshire, GB, vol. 458, No. 156, Jun. 2002, 3 pages.

Office Action dated Jun. 18, 2014 for U.S. Appl. No. 13/725,578, 13 pages.

Office Action dated Aug. 19, 2014 for U.S. Appl. No. 13/615,195, 22 pages.

European Search Report dated Aug. 11, 2014 for European Application No. 14167706.2-1955, 7 pages.

European Search Report dated Aug. 11, 2014 for European Application No. 14167714.6-1955, 5 pages.

European Search Report dated Aug. 11, 2014 for European Application No. 14167626.2-1955, 9 pages.

European Search Report dated Aug. 11, 2014 for European Application No. 14167627.0-1955, 6 pages.

European Search Report dated Aug. 11, 2014 for European Application No. 14167703.9-1955, 7 pages.

European Search Report dated Aug. 11, 2014 for European Application No. 14167707.0-1955, 7 pages.

European Search Report dated Aug. 11, 2014 for European Application No. 14167708.8-1955, 5 pages.

European Search Report dated Aug. 11, 2014 for European Application No. 14167712.0-1955, 5 pages.

European Search Report dated Aug. 11, 2014 for European Application No. 14167511.6-1955, 6 pages.

Office Action dated Oct. 9, 2014 for U.S. Appl. No. 13/725,543, 10 pages.

Office Action dated Dec. 12, 2014 for U.S. Appl. No. 13/725,578, 24 pages.

Office Action dated Nov. 25, 2015 for U.S. Appl. No. 14/087,873, 57 pages.

Final Office Action for U.S. Appl. No. 13/725,619 dated Dec. 4, 2015, 21 pages.

Final Office Action for U.S. Appl. No. 13/608,821 dated Dec. 7, 2015, 39 pages.

Final Office Action for U.S. Appl. No. 13/615,195, dated Feb. 11, 2016, 19 pages.

Non-Final Office Action for U.S. Appl. No. 13/725,543, dated Feb. 2, 2016, 15 pages.

Non-Final Office Action for U.S. Appl. No. 13/725,660, dated Jan. 21, 2016, 72 pages.

Final Office Action for U.S. Appl. No. 13/608,850, dated Dec. 9, 2015, 25 pages.

(56) References Cited

OTHER PUBLICATIONS

Office Action dated Nov. 24, 2015 for European Application No. 14167706.2-1955, 8 pages.
Office Action dated Nov. 24, 2015 for European Application No. 14167626.2-1955, 8 pages.
Office Action dated Sep. 22, 2015 for European Application No. 14167707.0-1955, 9 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,977 dated Mar. 17, 2016, 83 pages.
"Recursion Software,""SCADA-Aware Mobile"", Frisco, TX, Aug. 29, 2012 (accessed from<<http://www.emsenergyautomation.com/brochures/scada.pdf» on Feb. 11, 2016)".
"Ars Technica, ""Windows 7 themes: how to unlock them or create your own"", Nov. 12, 2009 (accessed from<<http://arstechnica.com/information-technology/2009/11/unlock-hidden-windows-7-themesl on Mar. 8, 2016»)".
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196775.0 dated Apr. 5, 2016, 14 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016 11 pages.
Chinese Office Action for Chinese Application No. 201410196114.8 dated Apr. 25, 2016, 20pages.
Chinese Office Action for Chinese Application No. 201410196525.7, dated May 5, 2016, 13 pages.
Chinese Office Action for Chinese Application No. 201410196775.0 dated May 5, 2016, 14 pages.
Chinese Office Action for Chinese Application No. 201410196127.5 dated Apr. 7, 2016, 13 pages.
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Chinese Office Action for Chinese Application Serial No. 201410195780.X, dated May 26, 2016, 16 pages (including translation).
Extended European Search Report for European Patent Application Serial No. 16160604.1, dated Aug. 17, 2016, 9 pages.

Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Chinese Office Action for Chinese Application No. 201410196198.5 dated Mar. 29, 2016, 18 pages.
Extended European Search Report for EP Patent Application Serial No. 16160611.6, dated Aug. 24, 2016, 10 pages.
Extended European Search Report for EP Patent Application Serial No. 16160602.5, dated Sep. 2, 2016, 9 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410195780.X, dated Feb. 3, 2017, 18 pages.
Chinese Office Action for CN Application Serial No. 201410196127.5, dated Nov. 30, 2016, 13 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-system-ICS<< on Jan. 11, 2017).
Office Action for European Patent Application Serial No. 16160604.1-1802, dated May 17, 2017, 6 pages.
Final Office Action for U.S. Appl. No. 14/087,730, dated Aug. 24, 2016, 113 pages.
Non-Final Office Action for U.S. Appl. No. 14/087,835, dated Sep. 23, 2016, 82 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.

(56) References Cited

OTHER PUBLICATIONS

Office Action for U.S. Appl. No. 14/088,011, dated Nov. 1, 2016, 79 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
European Office Action for EP Patent Application Serial No. 16160610.8, dated Oct. 17, 2016, 2 pages.
Final Office Action for U.S. Appl. No. 14/658,365 dated Sep. 8, 2017, 59 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Chinese Office Action for CN Application Serial No. 201410196114.8, dated Dec. 13, 2017, 26 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/088,011 dated Nov. 22, 2017, 77 pages.
Office Action for U.S. Appl. No. 14/087,970 dated Feb. 12, 2018, 69 pages.
Office Action for U.S. Appl. No. 15/143,733 dated Mar. 8, 2018, 141 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 5, 2018, 64 pages.
Office Action for U.S. Appl. No. 14/658,394, dated Apr. 6, 2018, 40 pages.

* cited by examiner

RISK ASSESSMENT FOR INDUSTRIAL SYSTEMS USING BIG DATA

RELATED APPLICATIONS

This application claims the benefit of U.S. Provisional Patent Application Ser. No. 61/821,639, filed on May 9, 2013, and entitled "REMOTE SERVICES AND ASSET MANAGEMENT SYSTEMS AND METHODS," the entirety of which is incorporated herein by reference.

TECHNICAL FIELD

The subject application relates generally to industrial automation, and, more particularly, to risk assessment for industrial systems using big data analysis in a cloud platform.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures. In general, industrial controllers read input data from sensors and metering devices that provide discreet and telemetric data regarding one or more states of the controlled system, and generate control outputs based on these inputs in accordance with the user-defined program.

In addition to industrial controllers and their associated I/O devices, some industrial automation systems may also include low-level control systems, such as vision systems, barcode marking systems, variable frequency drives, industrial robots, and the like which perform local control of portions of the industrial process, or which have their own localized control systems.

Owners of industrial assets sometimes perform risk assessment analysis on their manufacturing assets, business operations, and supply chain dynamics to identify aspects of their operation that pose a risk of machine downtime, inventory shortage, lost revenue, or other risk factors. These formal evaluations seek to quantify potential risk factors (e.g., failure of an automation device, shortage of inventory levels relative to product demand, etc.), probabilities that the risk factors will be realized, potential effects on other areas of the industrial enterprise, financial impacts, or other such factors.

Performing risk evaluations on large industrial enterprises, which are often distributed across multiple geographical locations, can be laborious process given the large number of interdependencies between industrial assets and processes, supply chain complexities, fluctuating business concerns, etc. Moreover, given the inherent complexities of industrial systems, conventional risk assessment techniques may not consider interdependencies that are hidden or non-obvious to risk evaluators performing the assessment. Opportunities to mitigate such hidden risk factors are therefore missed.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to risk assessment by analysis of large and diverse sets of data (referred to as "big data analysis") in a cloud platform. In one or more embodiments, a cloud-based risk assessment system running as a service on a cloud platform can collect and monitor device, asset, and system data from participating industrial facilities and enterprises. At the device level, the collected data can include device configuration information (e.g., device identifier, firmware version, configurations settings, etc.) as well as real-time status information for the devices (health and diagnostics, faults, alarms, etc.). At the asset and system levels, the collected data can include such information as asset key performance indicators (KPIs), process variables, and characterizations of larger system behavior over time. The risk assessment system can also collect relevant data from supply chain entities connected to the industrial enterprise (e.g., suppliers, warehouses, retail, etc.).

The risk assessment system can then perform analysis on the collected data in the cloud platform to identify potential areas of concern and their effects on the system as a whole. To this end, the risk assessment system can identify risk factors for a given industrial enterprise based in part on comparison of customer data with data collected from similar customers using similar industrial assets and configurations, learned trends based on big data analysis, or other analysis techniques. The system can also identify device- and configuration-specific risk factors based on learned risks associated with particular device combinations and/or configurations in use at multiple industrial facilities. Such learned risks can include, for example, an inferred propensity of a particular device or combination of devices to experience inefficient or failed performance after a given number of work cycles, a determination that a particular part or ingredient supplier is linked to poor product quality or delivery issues, etc.

In some embodiments, the cloud-based risk assessment system can also identify risks associated with device incompatibilities, where such incompatibilities are either explicitly reported by an equipment vendor or are learned based on analysis of system data collected from multiple industrial enterprises. Since analysis is based on global data collected in the cloud platform from multiple enterprises, vendors, and supply chain entities, further analysis can consider compatibility between equipment or devices provided by multiple different vendors, original equipment manufacturers (OEMs), or third-party entities.

The cloud-based risk assessment system can be configured to generate risk assessment reports on demand. In such embodiments, the reports can organize identified risks according to any suitable classification (e.g., classification according to production area, risk types, risk severity or cost, etc.). Embodiments of the risk assessment system can also be configured to monitor a customer's industrial systems substantially in real-time and provide alerts in response to detection of risk factors that merit attention. In this way, risk mitigations strategies can be implemented in response to such alerts.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
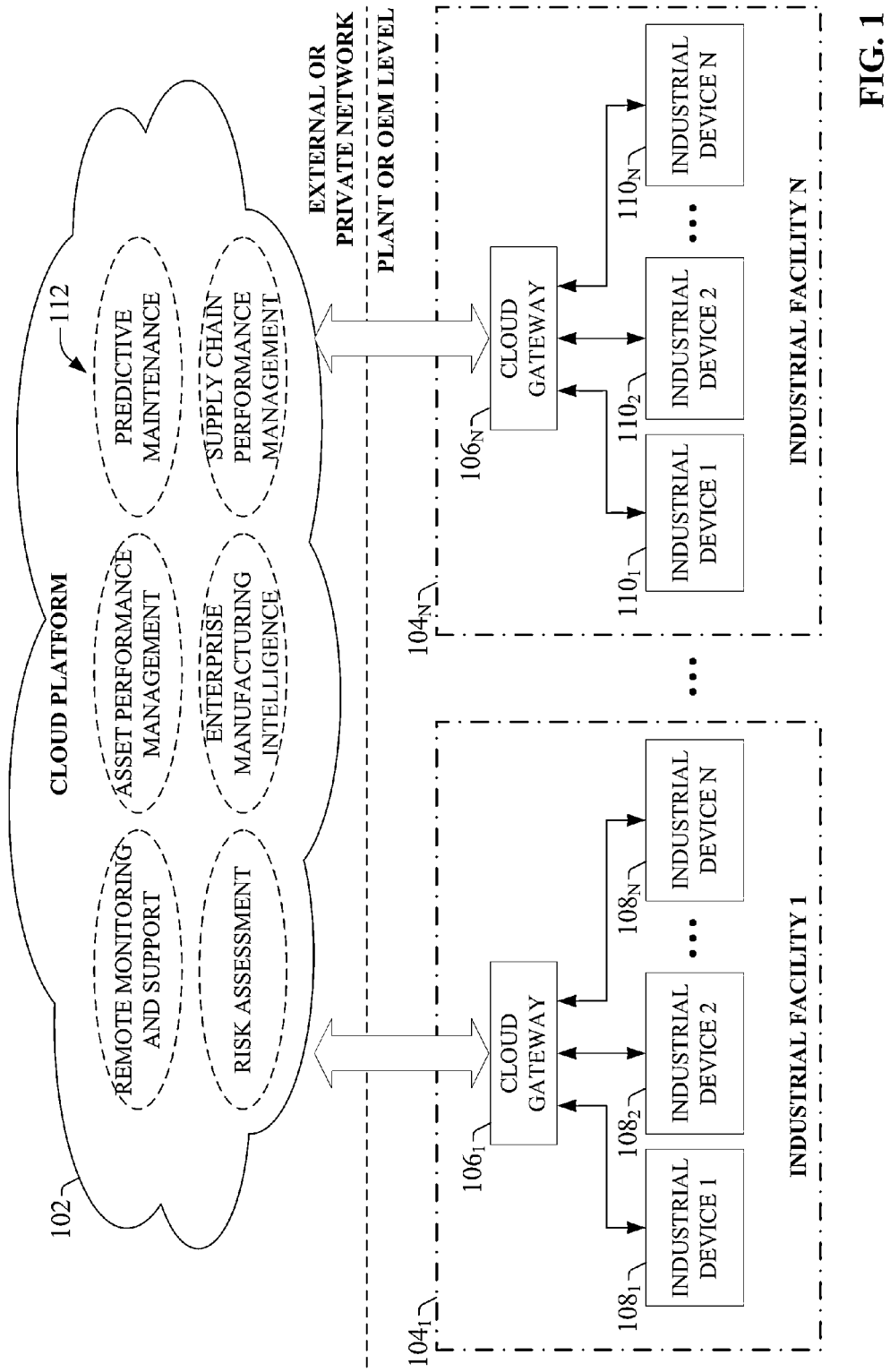
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To provide a general context for the cloud-based risk assessment system and services described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices may also be part of a mobile control and/or monitoring application, such as a system contained in a transportation unit (e.g., a truck or other service vehicle) or in a mobile industrial facility. In another example, industrial devices 108 and 110 may comprise devices that perform no control or monitoring of an industrial system, but instead function only to feed data to the cloud-based analysis system (e.g., a mobile weather station).

According to one or more embodiments of this disclosure, industrial devices 108 and 110 can be coupled to a cloud platform 102 to leverage cloud-based applications and services. That is, the industrial devices 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services 112. In some scenarios, the processing and storage resources of cloud platform 102 can be provided to an owner of the services 112 by a cloud provider as a platform-as-a-service (PaaS), and the services 112 can reside and execute on the cloud platform 102 as a cloud-based service. In some such configurations, access to the cloud platform 102 and associated services 112 can be provided to customers as a subscription service by an owner of the services 112. Alternatively, cloud platform 102 can be a private cloud operated internally by the enterprise. An exemplary private cloud platform can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), remote monitoring and support, device management, asset performance management, risk assessment services, predictive maintenance services, enterprise manufacturing intelligence services, supply chain performance management, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices 108 and 110 may access the cloud platform directly using an integrated cloud gateway service. Cloud gateways 106 may also comprise an integrated component of a network infrastructure device, such as a firewall box, router, or switch.

Providing industrial devices with cloud capability via cloud gateways 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can move or copy their respective automation data to the cloud platform 102 for aggregation, collation, collective big data analysis, and enterprise-level reporting without the need to establish a private network between the facilities. Industrial devices 108 and 110 and/or cloud gateways 106 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can access the industrial devices 108 and 110 via cloud gateways 106 to monitor the health of respective automation systems or their associated industrial devices across an entire plant, or across multiple industrial facilities that make up an enterprise. In another example, cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. As these examples demonstrate, the cloud platform 102, working with cloud gateways 106, can allow builders of industrial applications to provide scalable solutions as a service, removing the burden of maintenance, upgrading, and backup of the underlying infrastructure and framework.

Figure 2:
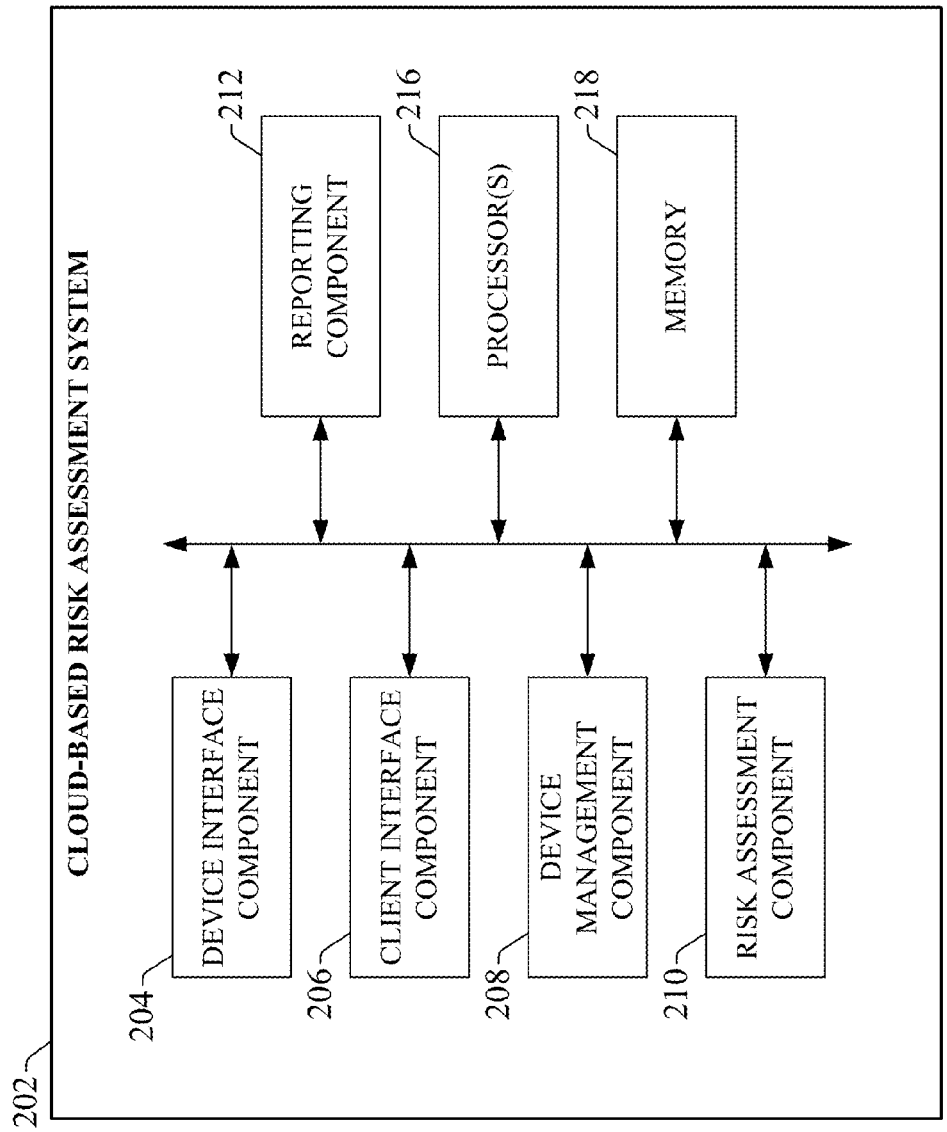
FIG. 2 is a block diagram of an exemplary cloud-based risk assessment system.

FIG. 2 is a block diagram of an exemplary cloud-based risk assessment system according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Risk assessment system 202 can include a device interface component 204, client interface component 206, a device management component 208, a risk assessment component 210, a reporting component 212, one or more processors 216, and memory 218. In various embodiments, one or more of the device interface component 204, client interface component 206, device management component 208, risk assessment component 210, reporting component 212, the one or more processors 216, and memory 218 can be electrically and/or communicatively coupled to one another to perform one or more of the functions of the risk assessment system 202. In some embodiments, components 204, 206, 208, 210, and 212 can comprise software instructions stored on memory 218 and executed by processor(s) 216. Risk assessment system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

Device interface component 204 can be configured to receive industrial data (e.g., configuration data, status data, process variable data, etc.) sent by one or more cloud-capable industrial devices, cloud gateways, or other sources of industrial data. Client interface component 206 can be configured to exchange data with one or more client devices via an Internet connection. For example, client interface component 206 can receive customer profile data, risk assessment parameters or preferences, customer service selections, or other such information from a client device. Client interface component 206 can also deliver risk assessment report data, notifications of newly discovered risk factors, risk mitigation recommendations, or other such data to the client device.

Device management component 208 can be configured to maintain and manage current information regarding devices comprising one or more industrial assets in use at an industrial facility. This information can include device identifiers, current firmware versions, current device configuration settings, information on neighboring devices that interact with the device, a role of the device within a larger system context, or other such information.

Risk assessment component 210 can be configured to perform big data analysis on data gathered and stored by the cloud-based risk assessment system. For example, analysis can be performed on large sets of device, asset, process, and system data collected from multiple industrial enterprises to identify operational patterns for individual devices or collections of devices comprising an industrial enterprise, optimal hardware and software configurations for particular industrial applications, device lifecycle trends, plant-level or business-level risk factors, or other analysis goals. As another example, risk assessment component 210 can compare a system configuration for a given industrial facility with the large set of data collected for similar industrial applications in use at other industrial facilities. Based on the comparison, risk assessment component 210 can identify risk factors common to similarly configured industrial systems and determine whether the system configuration under investigation is susceptible to such risk factors. Risk assessment component 210 can also determine whether a customer's industrial systems are subject to known risk factors reported by product vendors, OEMs, or other technical support entities.

Reporting component 212 can be configured to generate and deliver risk assessment reports to one or more client devices associated with plant personnel through client interface component 206 or technical support personnel based on results generated by risk assessment component 210.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
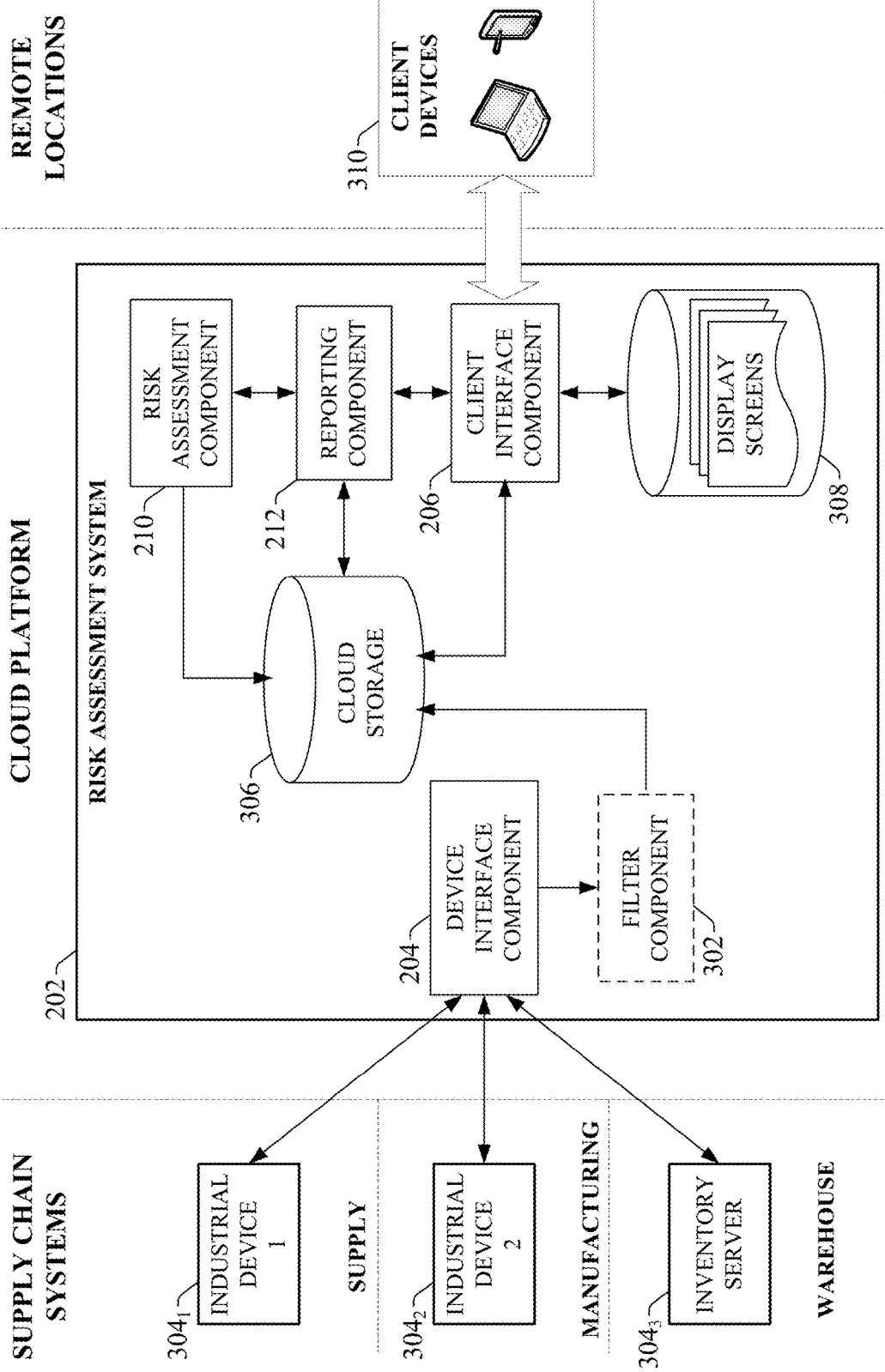
FIG. 3 is a block diagram illustrating components of an exemplary cloud-based risk assessment system.

FIG. 3 is a block diagram illustrating components of an exemplary cloud-based risk assessment system. As described above, cloud-based risk assessment system 202 can reside on a cloud platform and receive data from respective data generating devices 304. In one or more embodiments, the cloud-based risk assessment system 202 can reside and execute on the cloud platform as a cloud-based service, and access to the cloud platform and risk assessment system 202 can be provided to customers as a subscription service by a provider of the risk assessment services.

Devices 304 can comprise substantially any type of device that contains, collects, or generates data relating to a product or material within a supply chain. For example, industrial devices $304_1$ and $304_2$ can be plant floor devices that are part of respective automation systems at supply and manufacturing entities of the supply chain. These devices can include, but are not limited to, industrial controllers, sensors, meters, motor drives, HMI terminals, industrial robots, or other such industrial devices. Industrial devices $304_1$ and $304_2$ can be configured with cloud capabilities that allow the devices to be communicatively coupled to the cloud platform and exchange data with services residing thereon. Alternatively, industrial devices $304_1$ and $304_2$ can provide their data to the cloud platform via respective cloud proxy devices or other cloud gateways that collect data from multiple devices and move the data to the cloud platform for storage and processing. These various configurations are described in more detail below.

As illustrated in FIG. 3, data from other types of devices can also be collected in the cloud platform; for example, data from an inventory server $304_3$ at a warehouse stage of the supply chain. Inventory server $304_3$ can maintain, for example, current inventory levels for various products, records of product intakes and shipments, product order information, available warehouse capacity, and other such information. It is to be appreciated that other types of devices can provide data to risk assessment system 202 in addition to devices $304_1$-$304_3$. For example, mobile cloud gateways can be embedded on cargo vehicles that transport materials and product between supply chain entities. These cloud gateways can provide GPS information to the cloud indicating a current geographical location of a product shipment as the shipment is being transported through the supply chain. Additionally, sales and demand information can be provided to risk assessment system 202 by retail servers associated with retail outlets (not shown). At the supply and manufacturing stages, higher level business systems (e.g., ERP systems, reporting applications, financial systems, etc.) can provide business data relating to operations of the respective facilities. Moreover, devices 304 can be associated with respective automation systems at geographically diverse industrial facilities, or at different areas within the same facility which may or may not reside on a common local area network.

Data provided by devices 304 can be received by risk assessment system 202 via device interface component 204. Devices 304 can send their respective data to cloud-based risk assessment system 202 at a frequency defined by the risk assessment system 202. For example, an administrator or other user with suitable administrative privileges can define an upload frequency individually for the respective devices 304, and device interface component 204 can provide corresponding configuration instructions to the respective devices 304 configuring the upload frequencies accordingly. Alternatively or in addition, risk assessment system 202 may dynamically select a suitable upload frequency for the respective devices 304 during operation. For example, in order to control costs associated with cloud resource utilization, an administrator can, in one or more embodiments, configure a maximum total bandwidth usage for the cloud-based risk assessment system 202, such that the total instantaneous bandwidth usage for data traffic between the devices 304 and cloud-based risk assessment system 202 is not to exceed the configured maximum bandwidth. In such embodiments, cloud-based risk assessment system 202 can monitor the total bandwidth utilization substantially in real-time, and dynamically reduce the upload frequency of one or more devices 304 through device interface component 204 in response to a determination that the total bandwidth usage is approaching the defined maximum bandwidth.

Plant floor and supply chain data from devices 304 are received at device interface component 204, which can store the received data on cloud storage 306. In one or more embodiments, the received industrial data can first be filtered by a filter component 302, which can be configured to remove redundant or unnecessary data prior to storage. Filter component 302 can filter the data according to any specified filtering criterion, which may be defined by a filter profile or filter configuration data associated with risk assessment system 202. For example, valid data ranges can be defined for selected items of data received from devices 304, and filter component 302 can be configured to delete data values that fall outside these defined ranges. In this way, outlier data indicative of faulty data measurements can be filtered out prior to storage on the cloud platform. Filter component 302 can also be configured to identify redundant data collected from two or more of devices 304, and discard redundant instances of the same data.

Cloud storage 306 can comprise a subset of the cloud platform's storage resources provisioned to an end user entity (e.g., an industrial enterprise) for the purpose of storing the received plant floor data. For example, cloud storage 306 can be provided to an industrial enterprise as part of a subscription service that includes access to the cloud-based risk assessment system 202 and its associated cloud services.

Risk assessment system 202 also includes risk assessment component 210, which is configured to analyze data in cloud storage 306 to identify potential risk factors inherent in the customer's industrial enterprise according to techniques described in more detail below. Based on results obtained by risk assessment component 210, reporting component 212 can generate a broad, comprehensive risk assessment report for the customer's industrial enterprise, which can be delivered to one or more client devices 310 via client interface component 206. In some embodiments, the system may store a set of predefined display screens 308 for rendering report data to a client device. Services provided by this general architecture are described in more detail below.

Figure 4:
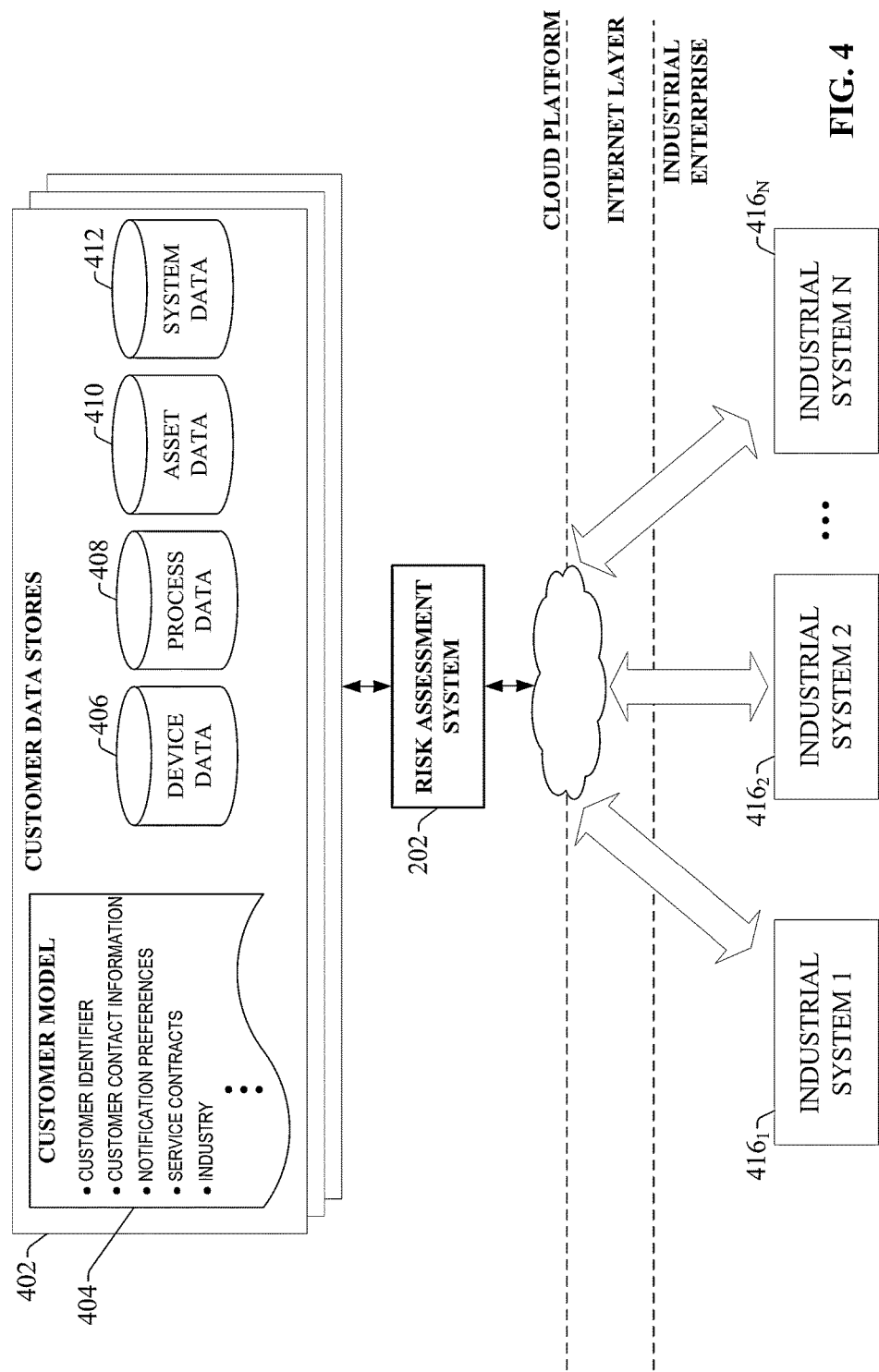
FIG. 4 illustrates collection of customer-specific industrial data by a cloud-based risk assessment system.

FIG. 4 illustrates collection of customer-specific industrial data by a cloud-based risk assessment system according to one or more embodiments. As discussed above, risk assessment system 202 can execute as a cloud-based service on a cloud platform (e.g., cloud platform 102 of FIG. 1), and collect data from multiple industrial systems 416. Industrial systems 416 can comprise different industrial automation systems within a given facility and/or different industrial facilities at diverse geographical locations. Industrial systems 416 can also correspond to different business entities (e.g., different industrial enterprises or customers), such that risk assessment system 202 collects and maintains a distinct customer data store 402 for each customer or business entity.

Figure 5:
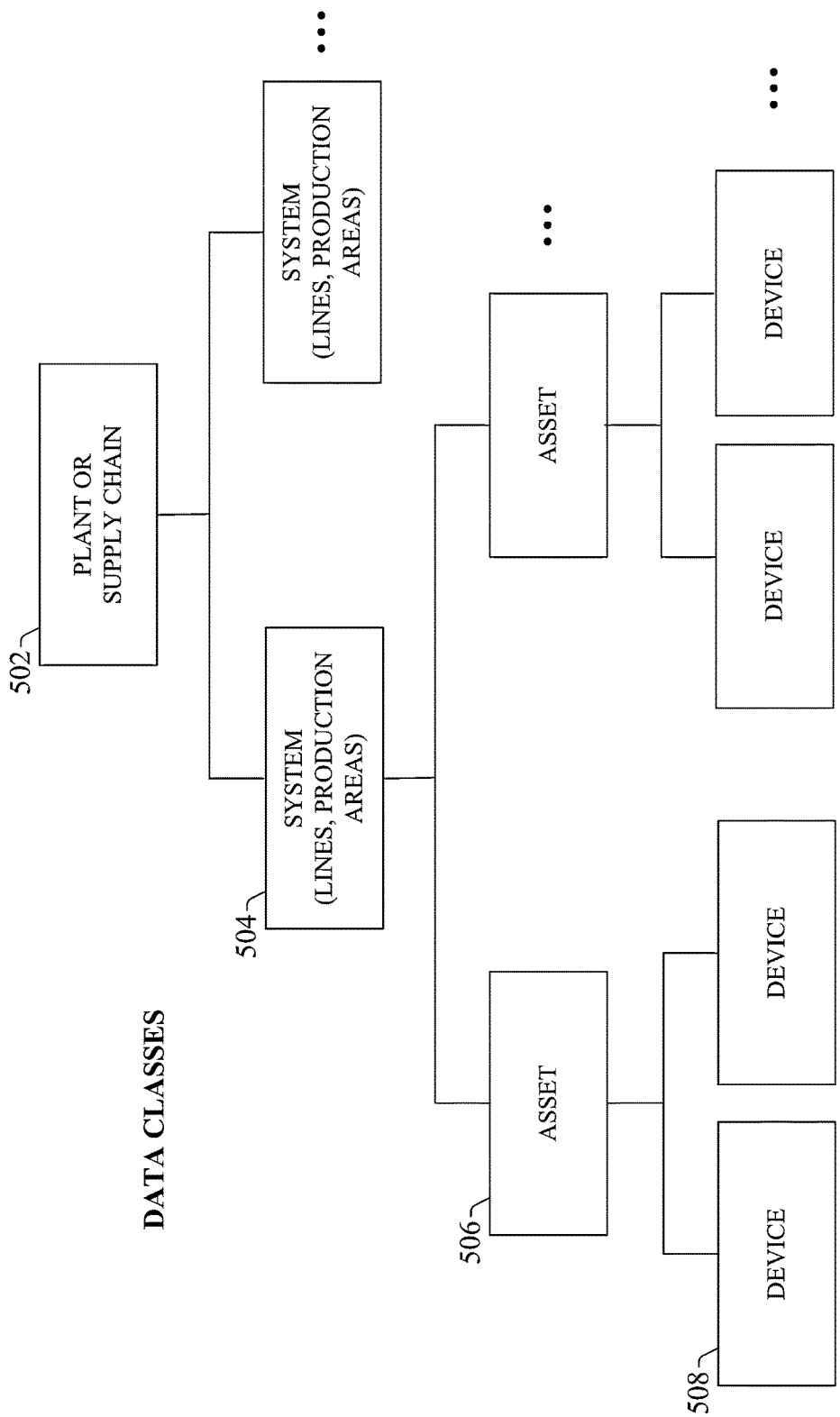
FIG. 5 illustrates a hierarchical relationship between example data classes.

Risk assessment system 202 can organize manufacturing data collected from industrial systems 416 according to various classes. In the illustrated example, manufacturing data is classified according to device data 406, process data 408, asset data 410, and system data 412. FIG. 5 illustrates a hierarchical relationship between these example data classes. A given plant or supply chain 502 can comprise one or more industrial systems 504. Systems 504 represent the production lines or productions areas within a given plant facility or across multiple facilities of a supply chain. Each system 504 is made up of a number of assets 506 representing the machines and equipment that make up the system (e.g., the various stages of a production line). In general, each asset 506 is made up of multiple devices 508, which can include, for example, the programmable controllers, motor drives, human-machine interfaces (HMIs), sensors, meters, etc. comprising the asset 506. The various data classes depicted in FIGS. 4 and 5 are only intended to be exemplary, and it is to be appreciated that any organization of industrial data classes maintained by risk assessment system 202 is within the scope of one or more embodiments of this disclosure.

Returning now to FIG. 4, risk assessment system 202 collects and maintains data from the various devices and assets that make up industrial systems 416 and classifies the data according to the aforementioned classes for the purposes of collective analysis and risk assessment. Device data 406 can comprise device-level information relating to the identity, configuration, and status of the respective devices comprising industrial systems 416, including but not limited to device identifiers, device statuses, current firmware versions, health and diagnostic data, device documentation, identification and relationship of neighboring devices that interact with the device, etc.

Process data 408 can comprise information relating to one or more processes or other automation operations carried out by the devices; e.g., device-level and process-level faults and alarms, process variable values (speeds, temperatures, pressures, etc.), and the like.

Asset data 410 can comprise information generated collected or inferred based on data aggregated from multiple industrial devices over time, which can yield a higher asset-level views of industrial systems 416. Example asset data 410 can include performance indicators (KPIs) for the respective assets, asset-level process variables, faults, alarms, etc. Since asset data 410 yields a longer term view of asset characteristics relative to the device and process data, risk assessment system 202 can leverage asset data 410 to identify operational patterns and correlations unique to each asset, among other types of analysis. The system can use such patterns and correlations to identify common risk indicators as a function of asset configuration across different types of industrial applications.

System data 412 can comprise collected or inferred information generated based on data aggregated from multiple assets over time. System data 412 can characterize system behavior within a large system of assets, yielding a system-level view of each industrial system 416. System data 412 can also document the particular system configurations in use and industrial operations performed at each industrial system 416. For example, system data 412 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be leveraged by risk assessment system 202 so that particulars of the customer's unique system and device configurations can be obtained without reliance on the customer to possess complete knowledge of their assets.

As an example, a given industrial facility can include packaging line (the system), which in turn can comprise a number of individual assets (a filler, a labeler, a capper, a palletizer, etc.). Each asset comprises a number of devices (controllers, variable frequency drives, HMIs, etc.). Using an architecture similar to that depicted in FIG. 1, risk assessment system 202 can collect industrial data from the individual devices during operation and classify the data in a customer data store 402 according to the aforementioned classifications. Note that some data may be duplicated across more than one class. For example, a process variable classified under process data 408 may also be relevant to the asset-level view of the system represented by asset data 410. Accordingly, such process variables may be classified under both classes. Moreover, subsets of data in one classification may be derived or inferred based on data under another classification. Subsets of system data 412 that characterize certain system behaviors, for example, may be inferred based on a long-term analysis of data in the lower-level classifications.

In addition to maintaining data classes 406-412, each customer data store can also maintain a customer model 404 containing data specific to a given industrial entity or customer. Customer model 404 contains customer-specific information and preferences, which can be leveraged by risk assessment system 202 to determine how identified risk factors should be handled or reported. Example information maintained in customer model 404 can include a client identifier, client contact information specifying which plant personnel should be notified in response to detection of risk factors (e.g., for embodiments that support real-time risk assessment monitoring), notification preferences specifying how plant personnel should be notified (e.g., email, mobile phone, text message, etc.), preferred data upload frequencies, service contracts that are active between the customer and a provider of the risk assessment services, the customer's industrial concern (e.g., automotive, pharmaceutical, oil and gas, etc.), and other such information. Risk assessment system 202 can marry data collected for each customer with the customer model for identification and event handling purposes.

Figure 6:
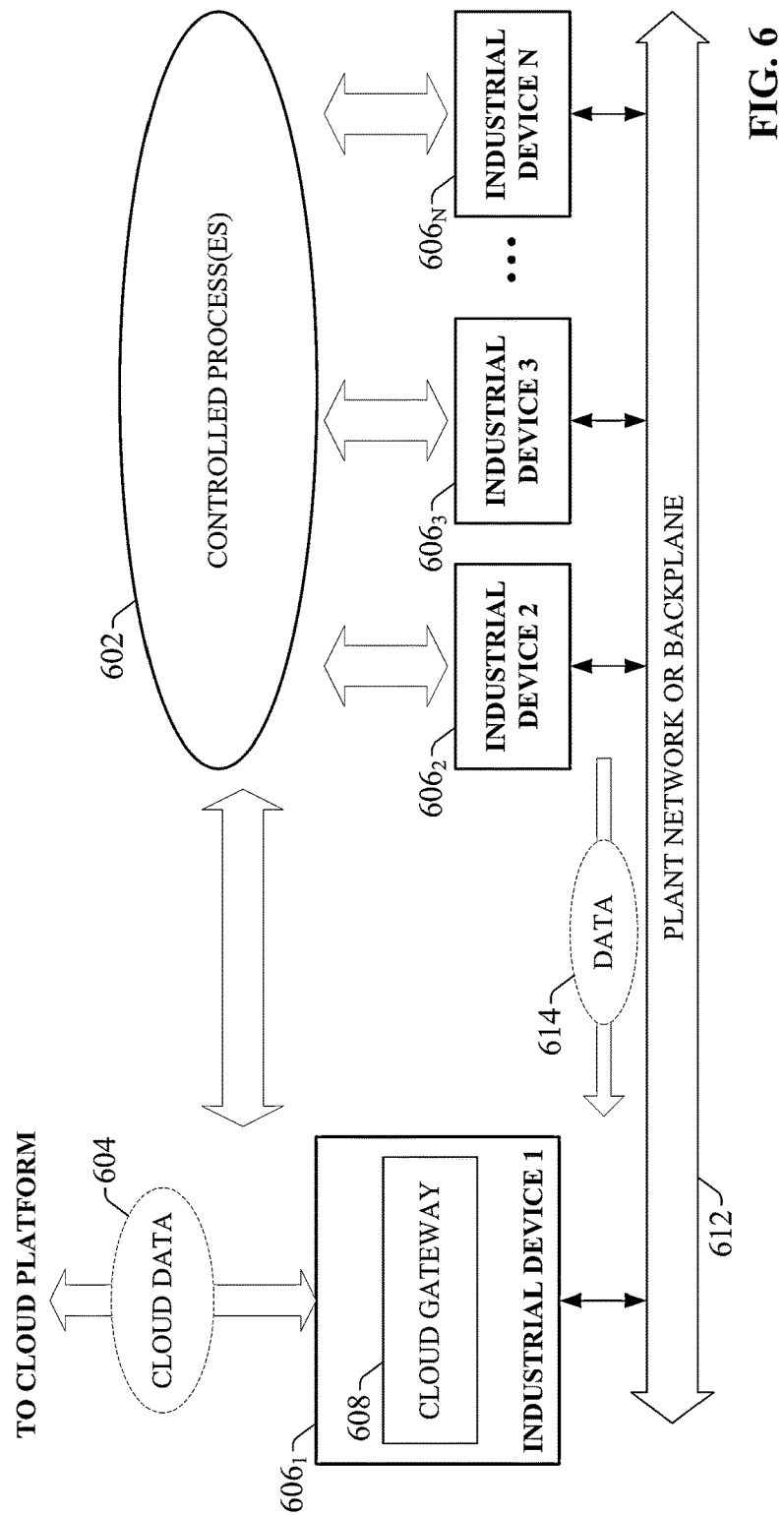
FIG. 6 illustrates a configuration in which an industrial device acts as a cloud proxy for other industrial devices comprising an industrial system.
Figure 7:
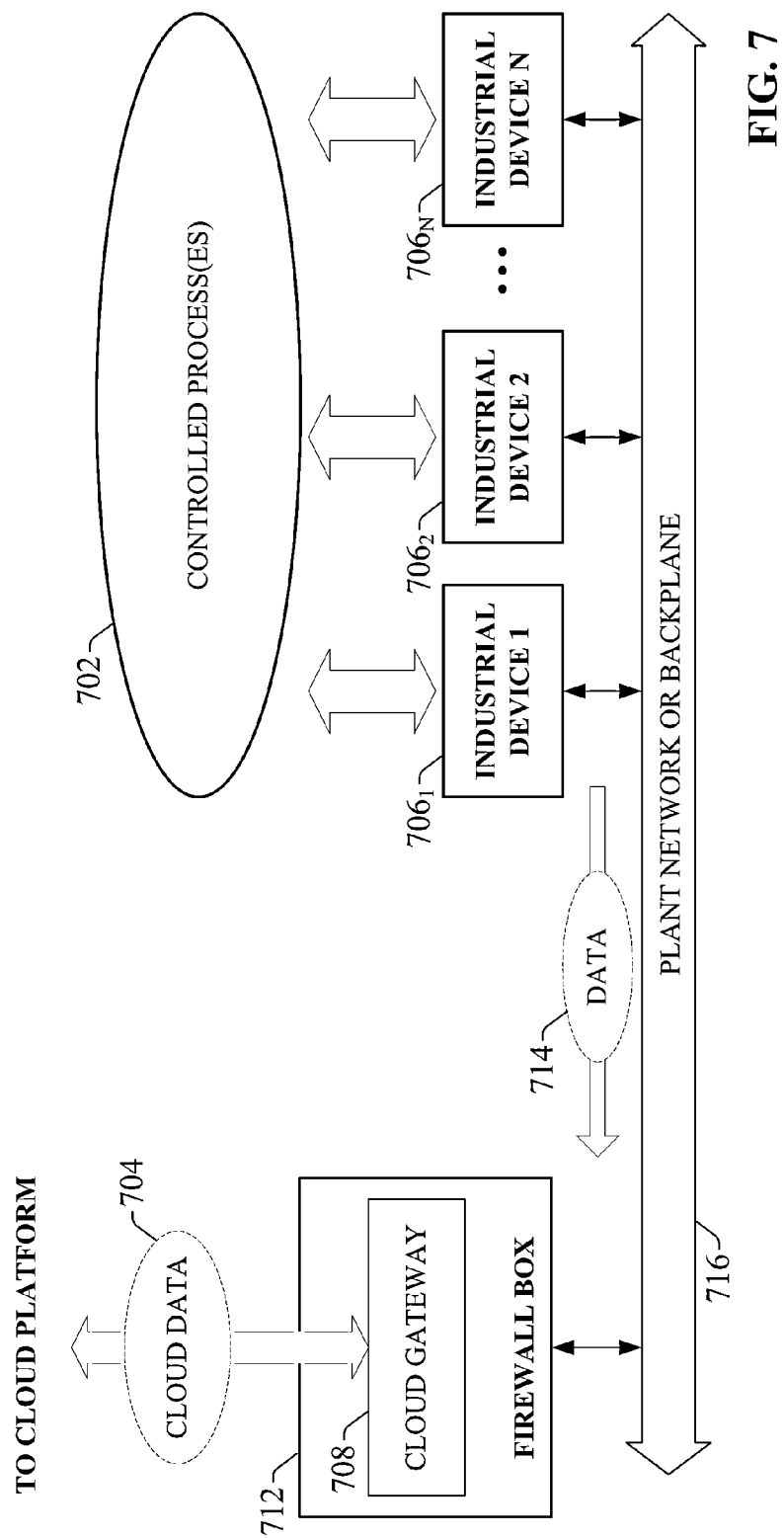
FIG. 7 illustrates a configuration in which a firewall box serves as a cloud proxy for a set of industrial devices.

As noted above, industrial data can be migrated from industrial devices to the cloud platform using cloud gateways. To this end, some devices may include integrated cloud gateways that directly interface each device to the cloud platform. Alternatively, as illustrated in FIGS. 6 and 7, some configurations may utilize a cloud proxy device that collects industrial data from multiple devices and sends the data to the cloud platform. Such a cloud proxy can comprise a dedicated data collection device, such as a proxy server that shares a network with the industrial devices. Alternatively, the cloud proxy can be a peer industrial device that collects data from other industrial devices.

FIGS. 6 and 7 depict example techniques for migrating industrial data to the cloud platform via proxy devices for classification and analysis by the risk assessment system. FIG. 6 depicts a configuration in which an industrial device acts as a cloud proxy for other industrial devices comprising an industrial system. The industrial system comprises a plurality of industrial devices $606_1$-$606_N$ which collectively monitor and/or control one or more controlled processes 602. The industrial devices $606_1$-$606_N$ respectively generate and/or collect process data relating to control of the controlled process(es) 602. For industrial controllers such as PLCs or other automation controllers, this can include collecting data from telemetry devices connected to the controller's I/O, generating data internally based on measured process values, etc.

In the configuration depicted in FIG. 6, industrial device 606$_1$ acts as a proxy for industrial devices 606$_2$-606$_N$, whereby data 614 from devices 606$_2$-606$_N$ is sent to the cloud via proxy industrial device 606$_1$. Industrial devices 606$_2$-606$_N$ can deliver their data 614 to proxy industrial device 606$_1$ over plant network or backplane 612 (e.g., a Common Industrial Protocol (CIP) network or other suitable network protocol). Using such a configuration, it is only necessary to interface one industrial device to the cloud platform (via cloud gateway 608). In some embodiments, cloud gateway 608 may perform preprocessing on the gathered data prior to migrating the data to the cloud platform (e.g., time stamping, filtering, formatting, summarizing, compressing, etc.). The collected and processed data can then be pushed to the cloud platform as cloud data 604 via cloud gateway 608. Once migrated, the cloud-based risk assessment system can classify the data according to the example classifications discussed above.

While the proxy device illustrated in FIG. 6 is depicted as an industrial device that itself performs monitoring and/or control of a portion of controlled process(es) 602, other types of devices can also be configured to serve as a cloud proxies for multiple industrial devices according to one or more embodiments of this disclosure. For example, FIG. 7 illustrates an embodiment in which a firewall box 712 serves as a cloud proxy for a set of industrial devices 706$_1$-706$_N$. Firewall box 712 can act as a network infrastructure device that allows plant network 716 to access an outside network such as the Internet, while also providing firewall protection that prevents unauthorized access to the plant network 716 from the Internet. In addition to these firewall functions, the firewall box 712 can include a cloud gateway 708 that interfaces the firewall box 712 with one or more cloud-based services. In a similar manner to proxy industrial device 606$_1$ of FIG. 6, the firewall box 712 can collect industrial data 714 from industrial devices 706$_1$-706$_N$, which monitor and control respective portions of controlled process(es) 702. Firewall box 712 can include a cloud gateway 708 that applies appropriate pre-processing to the gathered industrial data 714 prior to pushing the data to the cloud-based risk assessment system as cloud data 704. Firewall box 712 can allow industrial devices 706$_1$-706$_N$ to interact with the cloud platform without directly exposing the industrial devices to the Internet.

In some embodiments, cloud gateways 608 or 708 can tag the collected industrial data with contextual metadata prior to pushing the data to the cloud platform. Such contextual metadata can include, for example, a time stamp, a location of the device at the time the data was generated, or other such information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that defines multiple hierarchical levels of an industrial enterprise (e.g., a workcell level, a line level, an area level, a site level, an enterprise level, etc.), such that the data is identified in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by devices within the enterprise relative to the enterprise as a whole. Such a convention can replace the flat name structure employed by some industrial applications.

In some embodiments, cloud gateways 608 and 708 can comprise uni-directional "data only" gateways that are configured only to move data from the premises to the cloud platform. Alternatively, cloud gateways 608 and 708 can comprise bi-directional "data and configuration" gateways that are additionally configured to receive configuration or instruction data from services running on the cloud platform. Some cloud gateways may utilize store-and-forward technology that allows the gathered industrial data to be temporarily stored locally on storage associated with the cloud gateway in the event that communication between the gateway and cloud platform is disrupted. In such events, the cloud gateways will forward the stored data to the cloud platform when the communication link is re-established.

Figure 8:
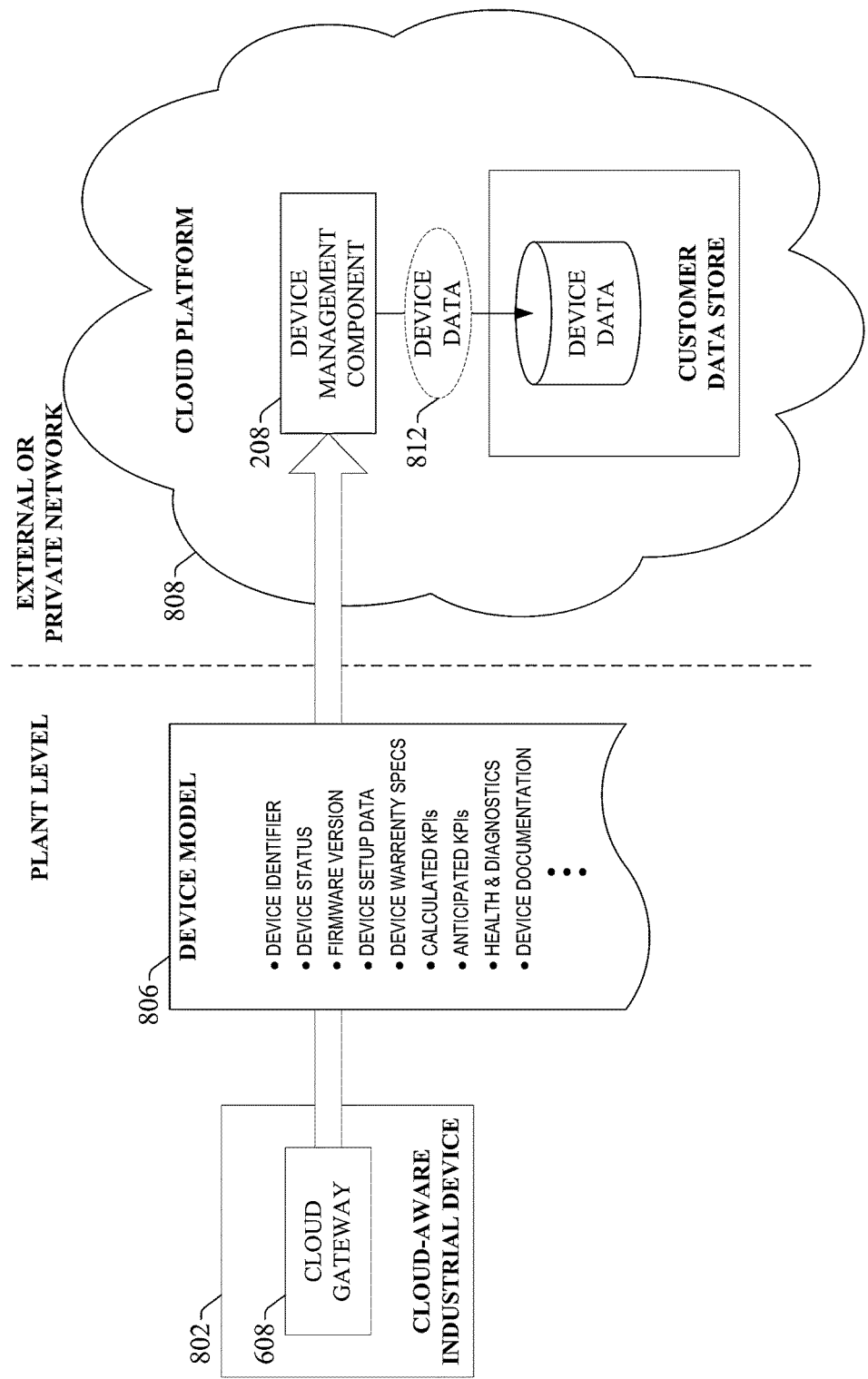
FIG. 8 illustrates delivery of a device model to a cloud-based risk assessment system.

To ensure a rich and descriptive set of data for analysis purposes, the cloud-based risk assessment system can collect device data in accordance with one or more standardized device models. To this end, a standardized device model can be developed for each industrial device. Device models profile the device data that is available to be collected and maintained by the risk assessment system. FIG. 8 illustrates an example device model according to one or more embodiments. In the illustrated example, device model 806 is associated with a cloud-aware industrial device 802 (e.g., a programmable logic controller, a variable frequency drive, a human-machine interface, a vision camera, a barcode marking system, etc.). As a cloud-aware device, industrial device 802 can be configured to automatically detect and communicate with cloud platform 808 upon installation at a plant facility, simplifying integration with existing cloud-based data storage, analysis, and applications (e.g., the risk assessment system described herein). When added to an existing industrial automation system, device 802 can communicate with the cloud platform and send identification and configuration information in the form of device model 806 to the cloud platform. Device model 806 can be received by a device management component 208, which then updates the customer's device data 812 based on the device model. In this way, the risk assessment system can leverage the device model to integrate the new device into the greater system as a whole. This integration can include updating cloud-based applications to recognize the new device, adding the new device to a dynamically updated data model of the customer's industrial enterprise or plant, making other devices on the plant floor aware of the new device, or other such integration functions. Once deployed, some data items defined by device model 806 can be collected by the risk assessment system, and in some embodiments can be monitored by the cloud-based system on a near real-time basis for continuous risk assessment.

Device model 806 can comprise such information as a device identifier (e.g., model and serial number), status information for the device, a currently installed firmware version, device setup data, device warranty specifications, calculated and anticipated KPIs associated with the device (e.g., mean time between failures), device health and diagnostic information, device documentation, or other such parameters.

Figure 9:
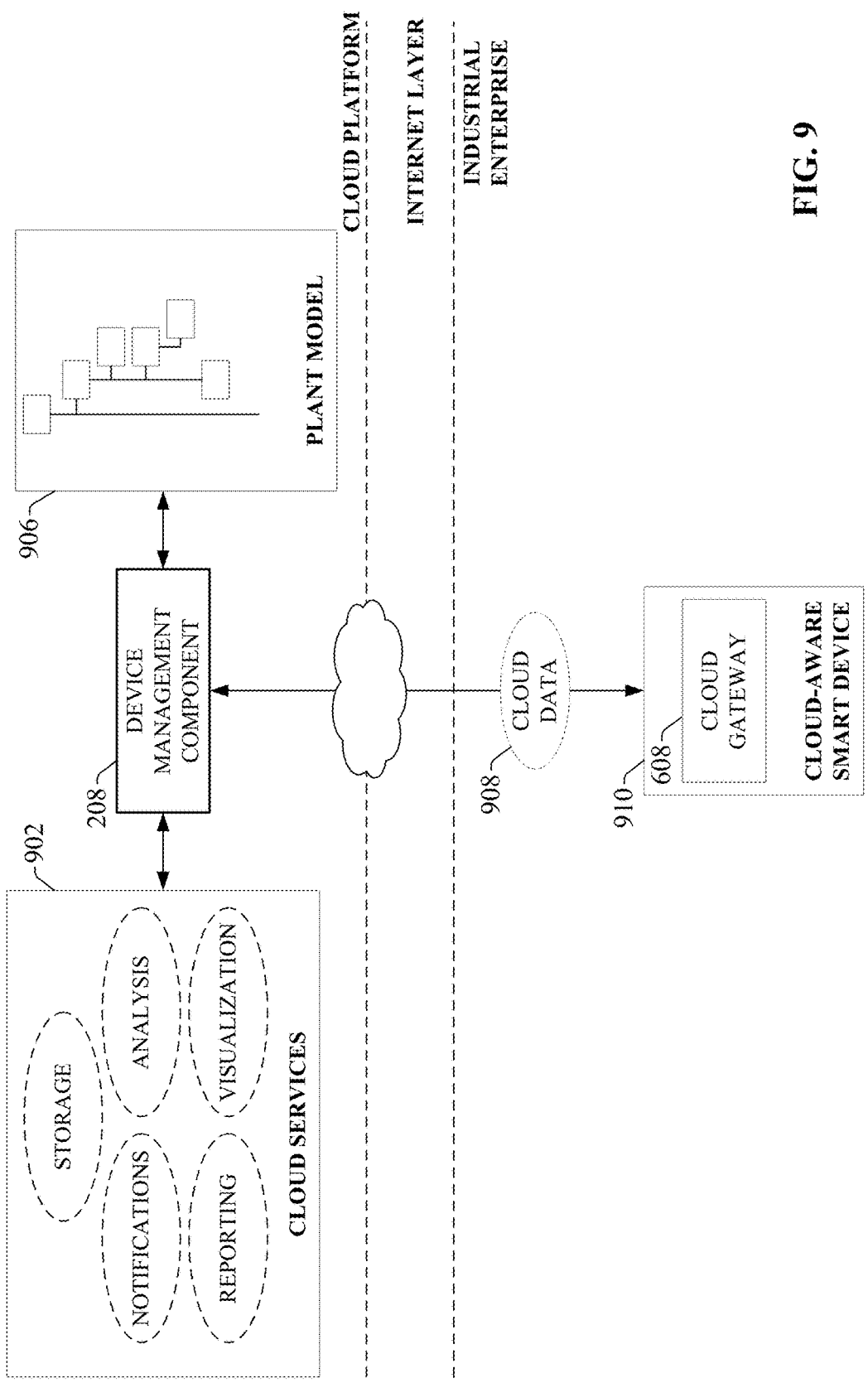
FIG. 9 illustrates automatic integration of a cloud-aware smart device within a larger device hierarchy.

To facilitate accurate risk assessment that considers not only the devices in use at a customer facility, but also the relationships between the devices and their context within the larger enterprise, some embodiments of the cloud-based risk assessment system can maintain a plant model for a given industrial enterprise based on the data collected as described above. To this end, services executing on the cloud platform can facilitate automatic integration of new or existing industrial devices into the plant model. Pursuant to an example, FIG. 9 illustrates automatic integration of a cloud-aware smart device within a larger device hierarchy. In this example, a cloud-aware smart device 910 installed as part of an industrial automation system within an industrial enterprise communicates with a cloud platform through an Internet layer. In some scenarios, cloud gateway 608 can initiate communication with the cloud platform upon installation and power-up of cloud-aware smart device, where the particular cloud platform or cloud-based application with which the device communicates is specified in a configuration file associated with the device. Once communication is established, cloud-aware smart device 910 can begin exchanging cloud data 908 with the cloud platform. Although cloud gateway 608 is depicted in FIG. 9 as exchanging cloud data 908 directly with the cloud platform, in some scenarios cloud gateway 608 may communicate with the cloud platform via a separate cloud gateway or other proxy device, as described above.

In the present example, cloud-aware smart device 910 communicates with device management component 208 running on the cloud platform. Device management component 208 can maintain a plant model 906 that models the industrial enterprise and devices therein. Plant model 906 can represent the industrial enterprise in terms of multiple hierarchical levels, where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.).

Plant model 906 allows devices of an automation system and data items stored therein to be described and identified in terms of these hierarchical levels, allowing a common terminology to be used across the entire enterprise to identify devices and data associated with those devices. Thus, individual items of device data (e.g., live analog and digital values stored in controller tags, archived data values stored in a historian register or other long-term data storage device, etc.), when integrated into plant model 906, can be identified and viewed by other applications using unique tags defined by plant model 906. Plant model 906 can represent industrial controllers, devices, machines, or processes as data structures (e.g., type instances) within this organizational hierarchy to provide context for data generated and stored throughout the enterprise relative to the enterprise as a whole.

Device management component 208 can leverage device model information provided by cloud-aware smart device 910 (e.g., device model 806 of FIG. 8) to facilitate auto-discovery of the smart device and creation of corresponding data structures representing the smart device in device model 806. For example, when cloud-aware smart device 910 is added to an industrial system of an enterprise, the device's cloud gateway 608 can send a device profile for the device to device management component 208 on the cloud platform. Device management component 208 can thereby automatically detect the device and determine the device's context within the organizational hierarchy modeled by plant model 906, and reconfigure plant model 906 to incorporate the newly added device at the appropriate location within the organizational hierarchy. This can include identifying data tags available within cloud-aware smart device and making those data tags available for viewing or retrieval by authorized applications using the hierarchical naming structure defined by plant model 906.

In some embodiments, cloud-aware smart device 910 can generate a portion of the device hierarchy represented by plant model 906, and provide this information to the cloud platform to facilitate accurately representing this portion of the device hierarchy within plant model 906. For example, if cloud-aware smart device 910 is an industrial controller that monitors and/or controls one or more production areas, the smart industrial controller can generate a hierarchical representation of the production areas, production lines, workcells, etc. of which it has knowledge, as well as devices associated therewith (e.g., I/O devices or subservient control systems that interface with the industrial controller). Cloud gateway 608 can provide this portion of the enterprise hierarchy to the cloud platform, and device management component 208 can update plant model 906 accordingly. Data provided by cloud-aware smart device 910, together with plant model 906, can be leveraged by any suitable cloud services 902 residing on the cloud platform, including the risk assessment system described herein.

Figure 10:
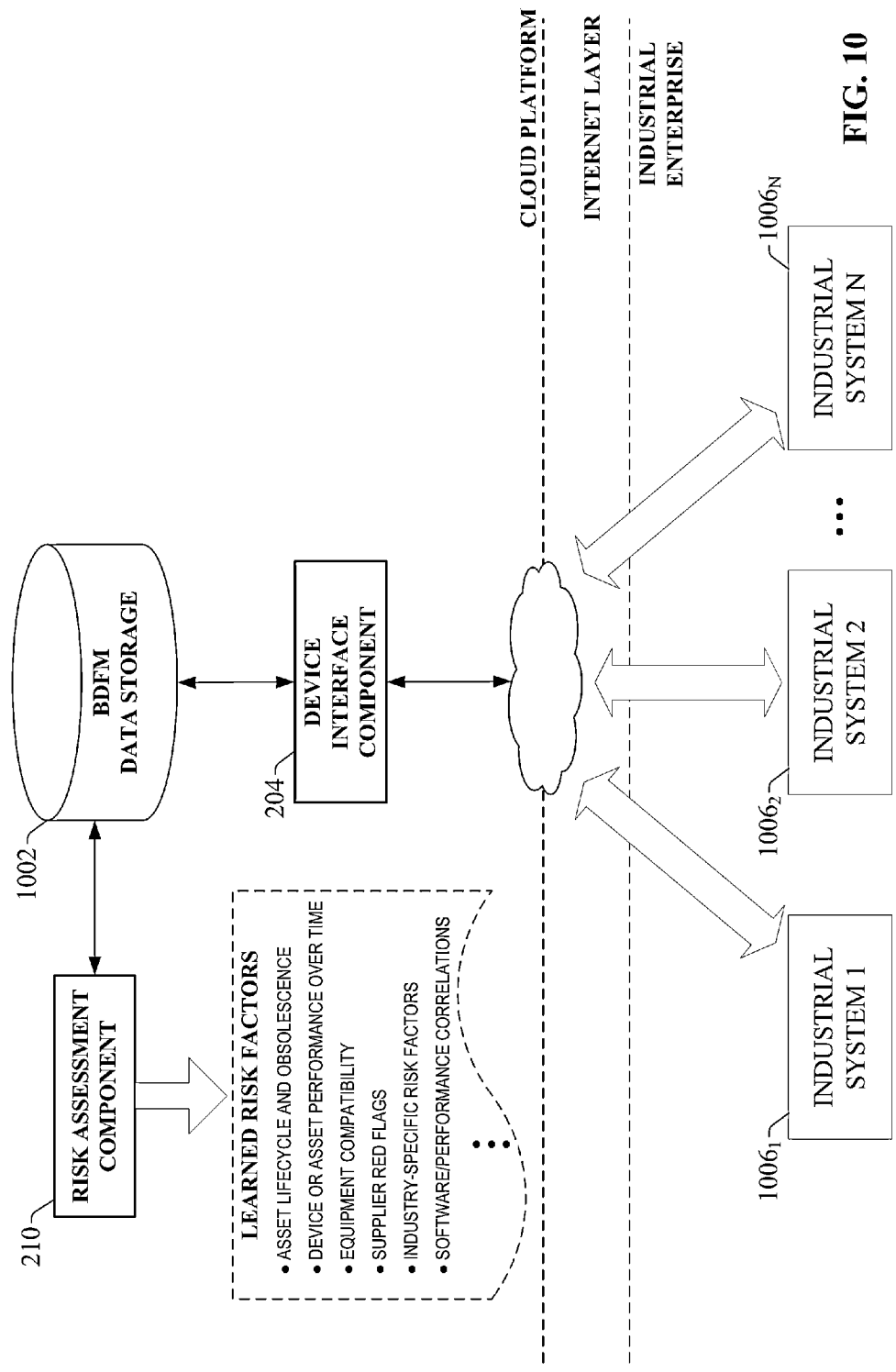
FIG. 10 illustrates collection of industrial data into cloud-based BDFM data storage for analysis by a cloud-based risk assessment system.

In addition to maintaining individual customer-specific data stores 402 for each industrial enterprise, the cloud-based risk assessment system can also feed sets of customer data to a global data storage (referred to herein as Big Data for Manufacturing, or BDFM, data storage) for collective big data analysis in the cloud. As illustrated in FIG. 10, device interface component 204 of the risk assessment system can collect data from devices and assets comprising respective different industrial systems 1006 for storage in cloud-based BDFM data storage 1002. In some embodiments, data maintained in BDFM data storage 1002 can be collected anonymously with the consent of the respective customers. For example, customers may enter into a service agreement with a technical support entity whereby the customer agrees to have their device and asset data collected by the cloud-based risk assessment system unassociated with their proprietary processes in exchange for risk assessment services. In reference to FIG. 4, this means the customer model 404 would not be associated to data stores 406, 408, 410, or 412, thereby protecting the customer's anonymity and intellectual property.

The data maintained in BDFM data storage 1002 can include all or portions of the classified customer-specific data described in connection with FIG. 4, as well as additional inferred data. BDFM data storage 1002 can organize the collected data according to device type, system type, application type, applicable industry, or other relevant categories. Risk assessment component 210 can analyze the resulting multi-industry, multi-customer data store to learn industry-specific, device-specific, and/or application-specific trends, patterns, thresholds, risk factors etc. Since data from multiple customers can be aggregated in a common cloud platform, one or more embodiments of risk assessment component 210 can identify subsets of data from multiple customers that can be analyzed collectively to learn industry- or system-specific trends. To this end, risk assessment component 210 can perform big data analysis on the multi-enterprise data maintained in BDFM data storage 1002 to learn and characterize operational trends, patterns, and/or potential risk factors as a function of industry type, application type, equipment in use, asset configurations, device configuration settings, business goals, or other such variables.

For example, it may be known that a given industrial asset (e.g., a device, a configuration of device, a machine, etc.) is used across different industries for different types of industrial applications. Accordingly, risk assessment component 210 can identify a subset of the global data stored in BDFM data storage 1002 relating to the asset or asset type, and perform analysis on this subset of data to determine how the asset or asset type performs over time for each of multiple different industries or types of industrial applications. Risk assessment component 210 may also determine the operational behavior of the asset over time for each of different sets of operating constraints or parameters (e.g. different ranges of operating temperatures or pressures, different recipe ingredients or ingredient types, etc.). Such analysis can yield lifecycle information for the asset that can subsequently be used to identify whether a customer is at risk of device or system obsolescence or degraded performance, as will be described in more detail herein.

Moreover, risk assessment component 210 can identify customers in similar industries who use similar system configurations, and analyze system or supply chain data from these customers to identify common risk factors or trends that may be generally applicable to all users of such systems. Such risk factors can be identified at the equipment level, plant level, personnel level, supply chain level, etc. By leveraging a large amount of historical data gathered from many different industrial systems in the cloud platform, risk assessment component 210 can learn common operating characteristics of many diverse configurations of industrial assets at a high degree of granularity and under many different operating contexts.

Risk assessment component 210 can also analyze the global data stored in BDFM data storage 1002 to identify potential risks associated with particular device configurations or combinations. In a non-limiting example, risk assessment component 210 can identify data sets corresponding to industrial systems designed to execute a common industrial application (e.g., a specific batch process, material handling application, web tension control application, etc.). The data sets can characterize any suitable performance metrics for the respective systems, including but not limited to product throughput, downtime frequencies or severities, frequency of alarm occurrences, product quality measurements, consumer feedback, or other such data. Risk assessment component 210 can then group the identified sets according to one or more variables, including but not limited to device configuration, software executed on one or more devices comprising the industrial systems, combinations of devices comprising the industrial systems, firmware versions installed on one or more of the devices, or other system characterizations. Based on comparative analysis of these groups data sets, risk assessment component 210 can infer, for the industrial application being examined, relative performance metrics as a function of the grouping variable (e.g., device configuration, software, device combinations, etc.) This learned information can subsequently be used by the system to determine whether a particular customer's system for performing the same industrial application is at risk of degraded or non-optimal performance, high downtime frequency, lost revenue opportunity, etc. Risk assessment component 210 can also identify correlations between software/firmware and system performance based on such analysis.

Since BDFM data storage can maintain large sets of data collected across an entire supply chain, one or more embodiments of risk assessment component 210 can leverage this data to determine potential risk factors at the supply chain level. For example, based on analysis BDFM data at the supply chain level, it may be determined that a particular part or ingredient supplier has experienced a relatively large number of order fulfillments delays or failures, issues relating to poor product quality, or other such issues. Accordingly, risk assessment component 210 can flag the supplier entity as a non-preferred or high risk supplier. Subsequently, risk assessments performed for a specific customer who receives parts or ingredients from this high risk supplier can identify the supplier as a risk factor, and recommend alternative sources for the part or ingredient as a risk mitigation strategy.

It is to be appreciated that the types of analyses described above are only intended to be example analyses that can be performed by risk assessment component 210 on BDFM data, and that any suitable technique for identifying trends, correlations, or relationships relevant to risk identification is within the scope of one or more embodiments of this disclosure.

Figure 11:
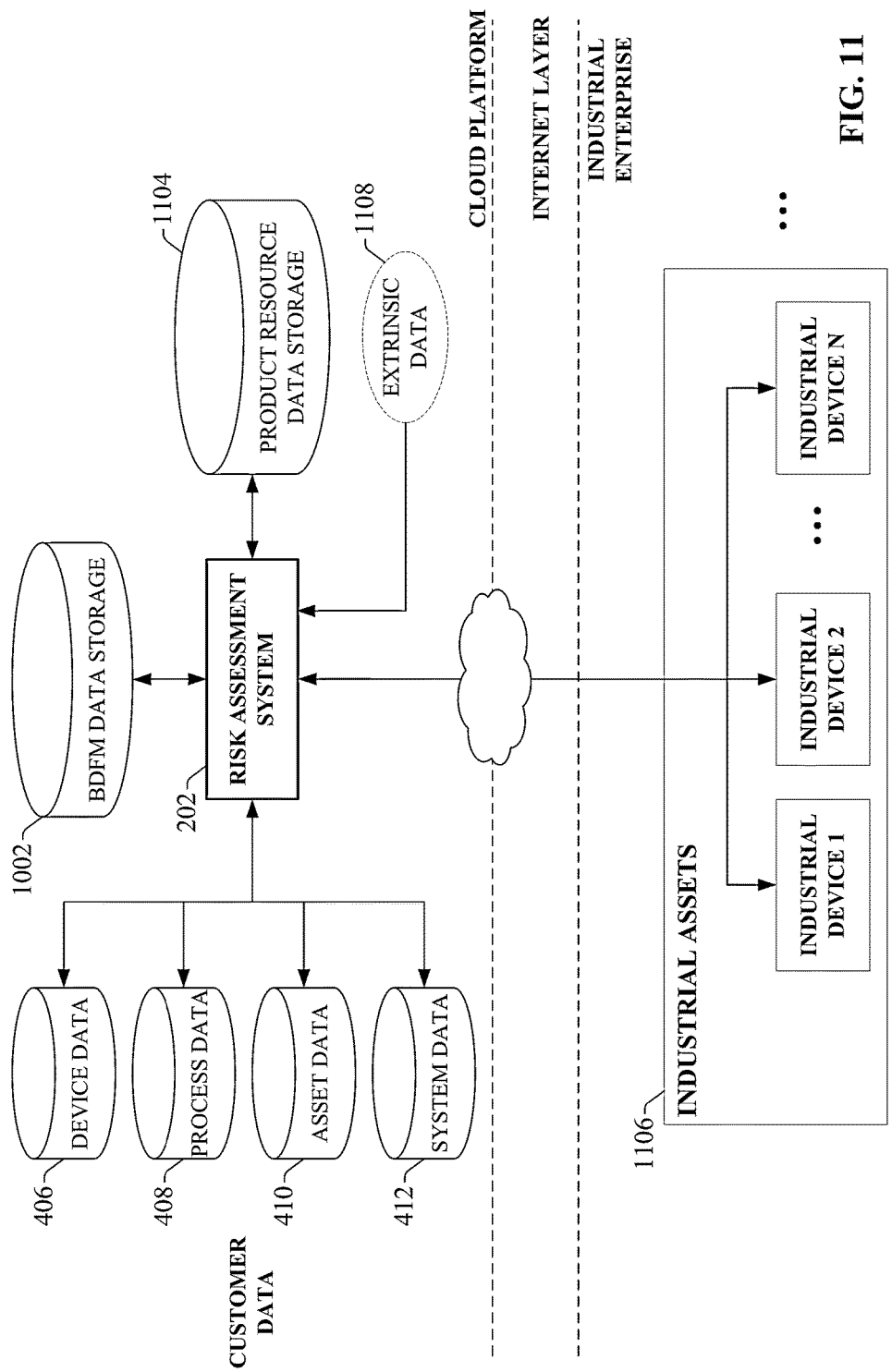
FIG. 11 illustrates a cloud-based system for providing risk assessment services to owners of industrial assets.

FIG. 11 illustrates a cloud-based system for providing risk assessment services to owners of industrial assets. As noted above, the cloud-based risk assessment system 202 can collect, maintain, and monitor customer-specific data (e.g. device data 406, process data 408, asset data 410, and system data 412) relating to one or more industrial assets 1106 of an industrial enterprise. In addition, risk assessment system 202 can collect and organize industrial data anonymously (with customer consent) from multiple industrial enterprises in BDFM data storage 1002 for collective analysis, as described above in connection with FIG. 10.

Risk assessment system 202 can also maintain product resource information in cloud-based product resource data storage 1104. In general, product resource data storage 1104 can maintain up-to-date information relating to specific industrial devices or other vendor products. Product data stored in product resource data storage 1104 can be administered by one or more product vendors or original equipment manufacturers (OEMs). Exemplary device-specific data maintained by product resource data storage 1104 can include product serial numbers, most recent firmware revisions, preferred device configuration settings and/or software for a given type of industrial application, third-party devices known to be incompatible with a vendor's device, or other such vendor-provided information.

Additionally, one or more embodiments of cloud-based risk assessment 202 can also leverage extrinsic data 1108 collected from sources external to the customer's industrial enterprise, but which may have relevance to operation of the customer's industrial systems. Example extrinsic data 1108 can include, for example, energy cost data, material cost and availability data, transportation schedule information from companies that provide product transportation services for the customer, market indicator data, web site traffic statistics, information relating to known information security breaches or threats, or other such information. Cloud-based risk assessment system 202 can retrieve extrinsic data 1108 from substantially any data source; e.g., servers or other data storage devices linked to the Internet, cloud-based storage that maintains extrinsic data of interest, or other sources.

The system depicted in FIG. 11 can provide risk assessment services to subscribing customers (e.g., owners of industrial assets 1106). For example, customers may enter an agreement with a product vendor or technical support entity to allow their system data to be gathered anonymously and fed into BDFM data storage 1002, thereby expanding the store of global data available for collective risk analysis (e.g., analysis described above in connection with FIG. 10). In exchange, the vendor or technical support entity can agree to provide customized risk assessment services to the customer (e.g., real-time risk monitoring, on-demand risk assessment, automated email alerting services, automated technical support notification, etc.). Alternatively, the customer may subscribe to one or more available risk assessment services, and optionally allow their system data to be maintained in BDFM data storage 1002. In some embodiments, a customer may be given an option to subscribe to risk assessment services without permitting their data to be stored in BDFM data storage 1002 for collective analysis with data from other systems. In such cases, the customer's data will only be maintained as customer data (e.g., in customer data store 402) for the purposes of identifying risk factors and possible risk mitigation strategies, and the collected customer data will be analyzed in view of BDFM data storage 1002 and product resource data storage 1104 without being migrated to BDFM data storage for long-term storage and analysis. In another exemplary agreement, customers may be offered a discount on risk assessment services in exchange for allowing their system data to be anonymously migrated to BDFM data storage 1002 for collective analysis.

Figure 12:
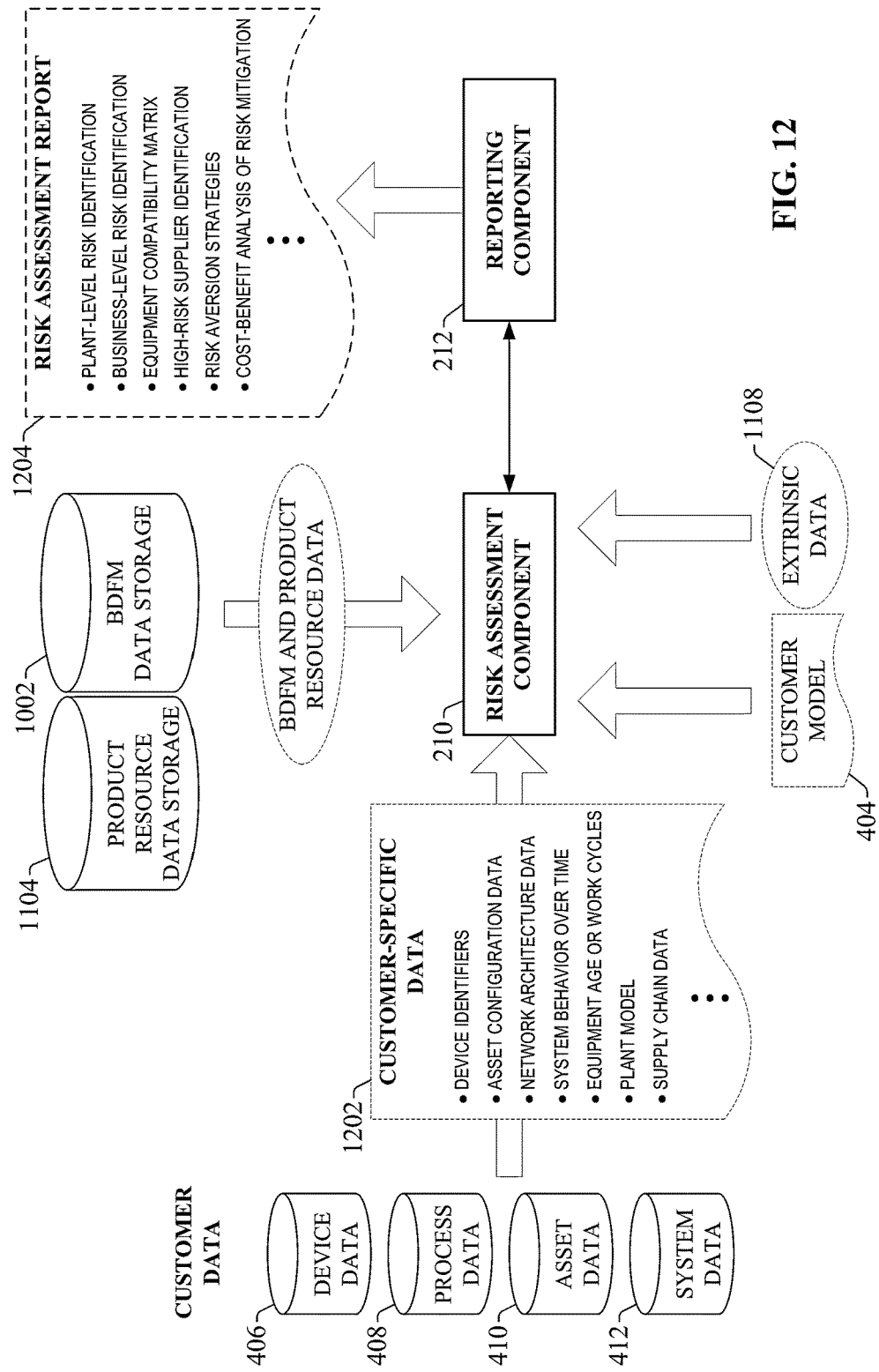
FIG. 12 illustrates generation of customized risk assessment reports based on analysis of collected customer data.

The system depicted in FIG. 11 can offer a variety risk assessment services to owners of industrial assets 1106, including generation of customized risk assessment reports for a customer's industrial systems. FIG. 12 illustrates generation of such customized risk assessment reports based on analysis of collected customer data according to the techniques described above. Risk assessment component 210 can perform big data analysis on customer data 1202 retrieved from a customer's collected device data 406, process data 408, asset data 410, and/or system data 412. The analysis can include correlation of the customer-specific data 1202 with global system data maintained in BDFM data storage 1002 and device information maintained in product resource data storage 1104 in order to identify risk factors associated with the customer's industrial enterprise. Risk assessment component 210 can also consider extrinsic data 1108, as described above. In addition, risk assessment component 210 can estimate effects that realization of such risk factors may have on the customer's plant-level of business-level goals, generate risk aversion strategies for mitigating the identified risks, or other such information As noted above, customer data 1202 can include both relatively static information characterizing the customer's systems as well as dynamic information describing system behavior over time. Static information can include, for example, identification of devices in use at the customer facilities, configuration information for the customer's devices and assets (e.g., firmware revisions, operating mode settings, software parameter settings, operating mode settings, operating setpoint values, etc.), network architecture information (e.g., identification of which devices are communicatively linked, identification of network infrastructure devices being used to network the devices, identification of which assets reside on each identified network segment, etc.), or other such information characterizing the customer's industrial systems. At least a portion of this customer-specific data can include the plant model 906 maintained by device management component 208 (see FIG. 9), which models the customer's industrial enterprise in terms of the hierarchical relationships between the devices and assets of the customer's industrial systems.

In addition, the customer data 1202 can include learned trends identified over time by risk assessment component 210 based on analysis of the collected customer data. Such learned trends can include, for example, behavior of certain assets or collections of assets over time, work cycle frequencies for respective devices or assets, downtime occurrences, trends relating to product throughput, energy consumption patterns, or other such dynamic information. Customer data 1202 can also include or infer (e.g., based on collected device data 406) a current age or number of work cycles accrued for one or more devices or assets comprising the customer's industrial systems.

Customer data 1202 can also include supply chain data that identifies other entities in the customer's supply chain and their relationship to the customer's enterprise. Such data can include supplier entities that provide parts, ingredients, or other services to the customer, warehouse entities that store and manage product inventory and shipment for the customer's industrial enterprise, retail entities that sell the customer's product, or other such supply chain entities. For the purposes of data analysis, this information can be compared against product resource data 1104.

Moreover, risk assessment component 210 can consider customer information encoded in customer model 404, which may have a bearing on inferences made during risk assessment analysis. For example, customer model 404 may indicate a type of industry that is the focus of the customer's business (e.g., automotive, food and drug, oil and gas, fibers and textiles, power generation, marine, etc.). Knowledge of the customer's industry can allow risk assessment component 210 to correlate the customer data 1202 with data relating to similar systems and applications in the same industry, as documented in BDFM data storage 1002.

Taken together, customer data 1202 and customer model 404 can accurately model the customer's industrial enterprise at a highly granular level, from high-level system behavior over time down to the device software level. By analyzing this customer data 1202 in view of global industry-specific and application-specific trends learned via analysis of BDFM data storage 1002, as well as vendor-provided device information maintained in product resource data storage 1104, risk assessment component 210 can generate a broad, comprehensive risk profile tailored to the customer's unique industrial enterprise.

In one or more embodiments, the risk profile can be generated as a risk assessment report 1204 by reporting component 212, based on results of analysis performed by risk assessment component 210. The risk assessment report 1204 can categorize identified risk factors according to any suitable classification schema. For example, risk assessment report 1204 can organize identified risk factors according to device-level risks (e.g., risk of future device failure, risk of degraded performance based on non-optimal device configurations or device incompatibilities), production area-level risks (e.g., risk of part starvation at a production area due to possible performance issues at a downstream production area), risks associated with particular processes, risks relating to supply chain product flow (e.g., risk of inventory shortage, risk that a manufacturing entity may be starved of components provided by a supplier entity given a predicted demand for a product), or other such classifications.

Pursuant to an example, based on analysis of collected supply chain data stored in BDFM data storage 1002, risk assessment component 210 may trace a defective batch produced by a particular industrial enterprise to sub-standard ingredients provided by a particular supplier entity. The supplier entity may have identified and reported the defective ingredients, and a corresponding indication was collected by the cloud-based risk assessment system for storage in BDFM data storage 1002. Accordingly, risk assessment component 210 labels the supplier entity as a potential risk (where the level of risk associated with the supplier entity may be a factor of a number and/or frequency of concerns flagged for that particular supplier). Subsequently, during a risk assessment performed for another customer, risk assessment component 210 determines that the customer is currently purchasing ingredients from the flagged supplier entity (based on analysis of customer data 1202). Based on correlation of this observation with the red flag data maintained in BDFM data storage 1002, risk assessment component 210 will flag the supplier as a risk factor. Since BDFM data storage 1002 maintains a vast set of global data across collected from many supply chain entities, risk assessment component 210 can also generate a recommendation for an alternative, low-risk supplier for the same ingredient.

Collection of plant, product, and business level data in the cloud platform from multiple industrial enterprises and supply chain entities allows the risk assessment system to consider factors that may not be visible to the customer, including equipment compatibility issues, device lifecycle and obsolescence, events extrinsic to the industrial enterprise, etc. For example, based on correlation of customer data 1202 with data maintained in one or both of product resource data storage 1104 or BDFM data storage 1002, risk assessment component 210 can determine that the customer is using an industrial asset comprising a combination of devices having a known compatibility issue, which is preventing or limiting certain functionalities of the industrial asset. The compatibility issue may have been discovered by a product vendor and reported to the risk assessment system as product resource data (stored in product resource data storage 1104). Alternatively, risk assessment component 210 may have inferred the compatibility issue via analysis of BDFM data collected in the cloud platform. In this scenario, risk assessment component 210 may perform comparative analysis on sets of BDFM data corresponding to a particular industrial application, but collected from different industrial enterprises using different combinations of equipment, devices, or assets. Based on this analysis, risk assessment component 210 may determine that a particular combination of devices for performing the industrial application results in sub-standard performance (e.g., higher frequency of downtime events, lower product throughput, suppression of latent functionality, etc.). Accordingly, if risk assessment component 210 determines that a particular customer is using this sub-standard combination of devices or assets (based on analysis of customer data 1202 in view of the inferred BDFM data), the system may generate risk assessment report 1204 identifying the risk associated with use of the particular asset configuration.

Figure 13:
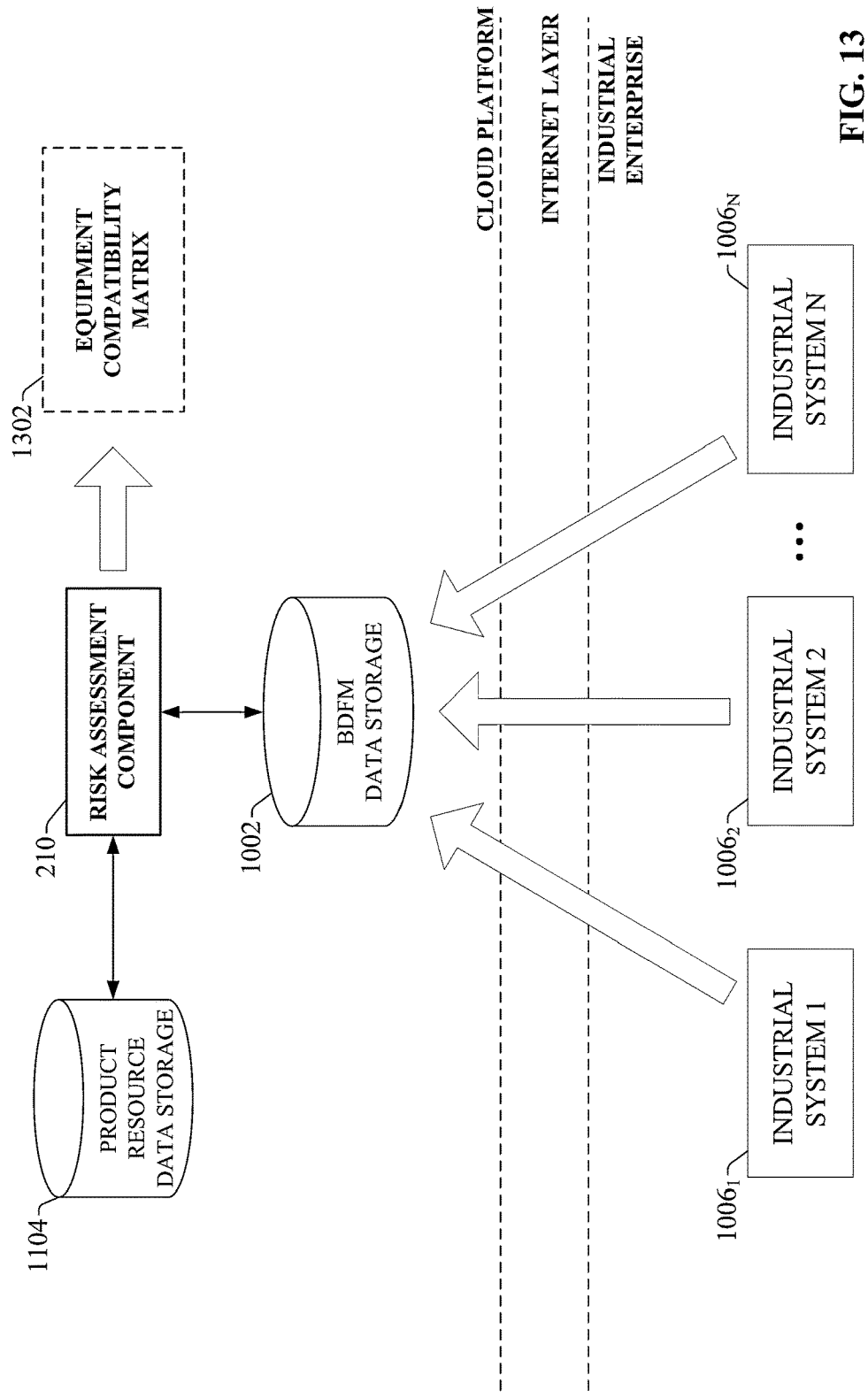
FIG. 13 illustrates generation of an equipment compatibility matrix based on analysis of industrial data by a cloud-based risk assessment system.

In another example, risk assessment component 210 can generate and maintain an equipment compatibility matrix based on analysis of BDFM data and product resource data, as illustrated in FIG. 13. Using analysis techniques described above, risk assessment component can create and maintain equipment compatibility matrix 1302 based on data maintained in BDFM data storage 1002 collected from multiple customers (e.g., data collected anonymously as described above in connection with FIGS. 4-9) and/or equipment compatibility knowledge provided by equipment vendors, OEMs, etc. maintained in product resource data storage 1104. Equipment compatibility matrix 1302 can encode knowledge of compatibility between devices and device configurations, including compatibility between devices provided by different vendors. For example, for a given variable frequency drive (VFD) model and vendor, equipment compatibility matrix 1302 can identify one or more industrial controllers having known incompatibilities with the VFD. Equipment compatibility matrix may also maintain records of compatibility between devices as a function of the firmware versions installed on the respective devices, such that incompatibility issues introduced when a particular firmware version is installed on the VFD or industrial controller are recorded in the equipment compatibility matrix 1302.

Figure 14:
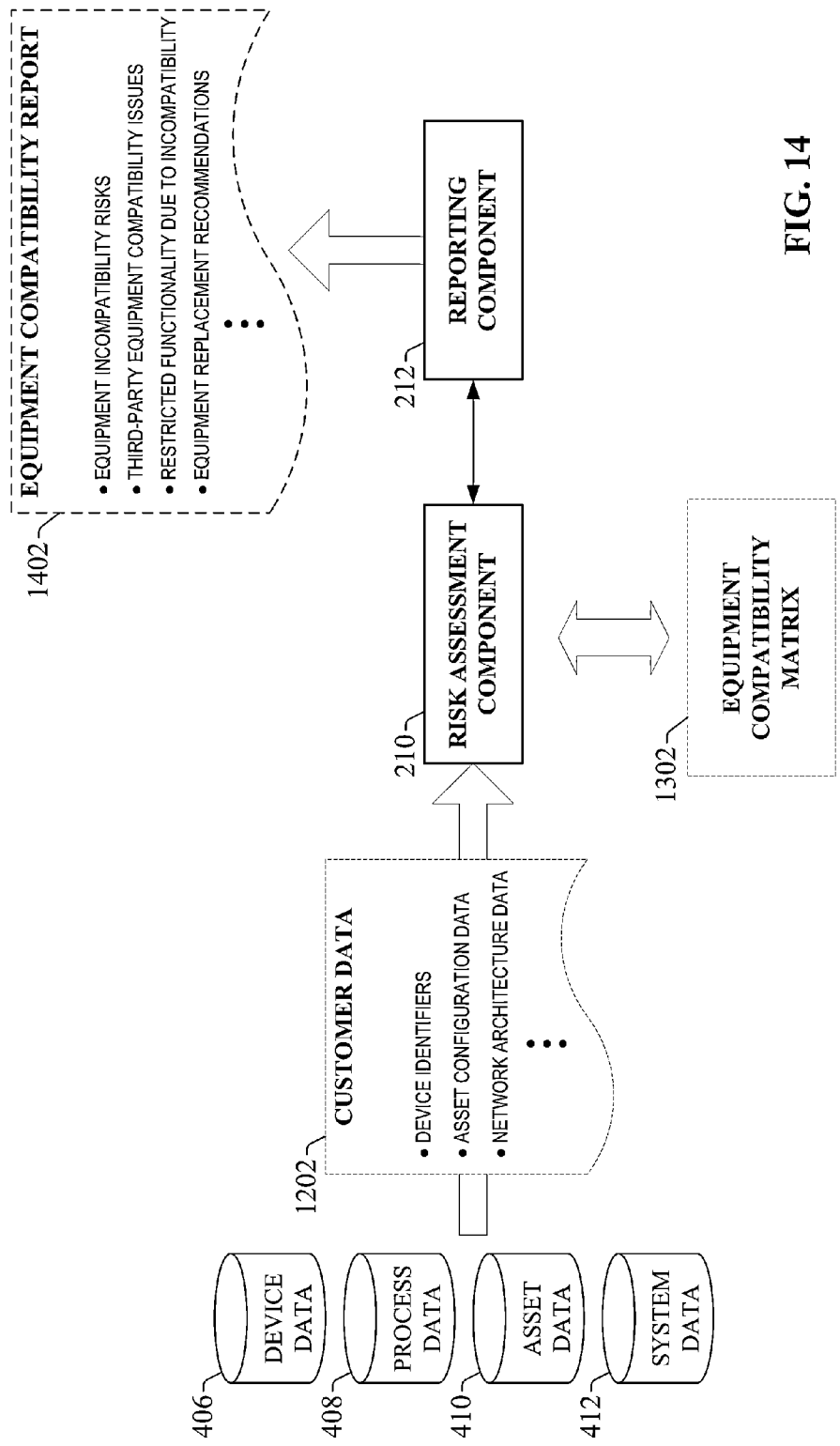
FIG. 14 illustrates generation of an equipment compatibility report based on a comparison between customer-specific industrial data and an equipment compatibility matrix.

Equipment compatibility matrix 1302 can be maintained in cloud storage for access by risk assessment component 210 as part of a risk assessment analysis for a given customer. As illustrated in FIG. 14, the risk assessment component 210 can compare customer data 1202 with the equipment compatibility matrix 1302 to determine potential risks associated with equipment incompatibility, known or discovered issues associated with particular combinations of devices used in particular types of industries or applications, firmware versions installed on certain devices that cause non-optimal functional interaction with other devices, etc. Based on this assessment, reporting component 212 can generate an equipment compatibility report 1402 identifying risks associated with device incompatibility, incompatibility with third-party systems, etc. Equipment compatibility report 1402 can also include recommendations for product replacements that would mitigate the identified incompatibility risks. Equipment compatibility report 1402 may also identify alternative devices that, when deployed as a replacement for one or more existing devices of the customer's industrial system, will enable a broader set of functionalities than are available under the customer's current system configuration by virtue of greater functional compatibility with one or more existing devices.

Returning now to FIG. 12, since the cloud-based risk assessment system maintains customer data stores (containing customer data 1202 and/or customer model 404) that identify the equipment in use at each customer site and their current configurations, firmware revisions, programs, etc., risk assessment component 210 can identify which of these devices are associated with a risk of failure based on age, total number of work cycles, software version, etc. Risk assessment component 210 can infer a particular device's time-to-failure based on analysis of BDFM data maintained in BDFM data storage (e.g., using techniques described above in connection with FIG. 10), and apply this knowledge when generating a customer-specific risk assessment report 1204. For example, risk assessment component 210 may identify subsets of BDFM data relating to a specified device model used in a particular type of industrial application. These subsets of data can include device lifecycle data, frequency of alarms or downtime events over time, product throughput over time, etc. Risk assessment component 210 can also assess these trends as a function of industry type, firmware revision, program code executed by the device, work cycle frequency, or other such variables.

By identifying these trends over time for multiple industrial applications that include the specified device, risk assessment component 210 can ascertain expected lifecycle or time-to-failure for the device under different operating scenarios, industrial applications, software configurations, etc. Subsequently, when performing risk assessment on customer data 1202, risk assessment component 210 can determine whether the customer is using the device, how the device is configured, and the operating context of the device, and correlate this customer-specific information with the learned lifecycle trends for the device under similar conditions to determine whether the device is at risk of failure or degraded performance. In some embodiments, risk assessment component 210 can also determine an effect that failure of the device will have on other aspects of the customer's larger industrial enterprise (e.g., which production areas will be effected, a cost associated with lost production time, etc.), and include this information on risk assessment report 1204. If it is determined that the device is nearing an end of its lifecycle, risk assessment report 1204 may recommend replacement or reconfiguration of the device as a risk mitigation strategy.

In another example, risk assessment component 210 may identify that one of the customer's industrial assets includes a device that is no longer supported; e.g., by referencing product resource data storage 1104, which maintains vendor information identifying which products are currently supported. Risk assessment component 210 can also quantify the risks associated with failure of the device given the lack of easy replacement, the role of the device in the customer's overall process etc. This information can be included in risk assessment report 1204, together with a recommendation to replace the obsolete device, identification of newer supported devices that can serve as a replacement, a cost-benefit analysis associated with device replacement, etc.

In addition to identification of risk factors associated with industrial hardware and software, as described above, one or more embodiments of the cloud-based risk assessment system can also identify and quantify risks associated with a customer's plant network architecture. For example, in addition to maintaining a record of each customer's industrial assets, customer data sets 406, 408, 410, and 412 may include information regarding the plant network architectures used for communication between the devices. This can include maintaining, in the customer data stores 402 (see FIG. 4), records of plant-floor network infrastructure devices in use (e.g., hubs, switches, routers, etc.), how various branches of the network are connected, which industrial assets or devices are connected to each identified network branch, or other such information. Based on this information, the cloud-based risk assessment system can determine possible effects that failure of a given network infrastructure device may have on the customer's industrial operations as a whole.

For example, risk assessment component 210 may work in conjunction with a cloud-based network simulation component (not shown) to determine which production areas, industrial assets, and/or processes would be affected by failure of a given network infrastructure device. This determination can be based in part on knowledge of which industrial devices are communicatively connected via the infrastructure device, which industrial assets reside on each network branch, etc. Accordingly, risk assessment report 1204 can identify and quantify risks associated with failure of any one of the network architecture devices, including identification of which plant processes are likely to be affected in the event of a network device failure. In some embodiments, risk assessment component 210 can also estimate costs associated with failure of a given network infrastructure device (e.g., lost revenue over time given inoperability of affected production areas, etc.). Additionally, risk assessment component 210 can identify alternative network configurations and report these options as possible risk mitigation strategies. Such strategies can include, for example, rerouting of certain network branches, addition of redundant network devices at network nodes deemed critical, etc.

The system can also track network traffic on the plant network in order to identify potential risks associated with network overload. For example, the risk assessment system may determine that network traffic through a particular network infrastructure device creates a risk of data traffic bottlenecking, which may result in slower response times for critical devices. Accordingly, the system may recommend replacing the network infrastructure device with a higher capacity device, or reconfiguring the network to distribute the identified network traffic more evenly.

In addition to identification plant-level risk factors, one or more embodiments of the cloud-based risk assessment system can also assist with risk aversion planning from a business-level standpoint. To this end, one or more embodiments of risk assessment report 1204 can include information quantifying possible financial savings associated with mitigation of one or more identified risk factors. For example, for a given risk factor identified according to one or more techniques described above, risk assessment component 210 can perform a cost-benefit analysis that factors a cost of implementing a risk aversion countermeasure (e.g., replacing an obsolete device, scheduling an extra production shift to increase inventory in preparation for a spike in demand, etc.) against possible financial loss in the event that the risk factor is realized (e.g., costs associated with loss of production in the event of a device failure, lost revenue opportunity in the event of an inventory shortage or failure to satisfy a work order, etc.). To perform such cost-benefit analysis, risk assessment component 210 may leverage extrinsic data 1108 relating to anticipated demand for product, anticipated sale price obtained for their product to determine potential lost revenue, etc. In the particular scenario of performing a cost-benefit analysis for replacement of an aging device, risk assessment component 210 may also leverage product resource data stored in product resource data storage 1104 to determine a cost for replacement devices.

Figure 15:
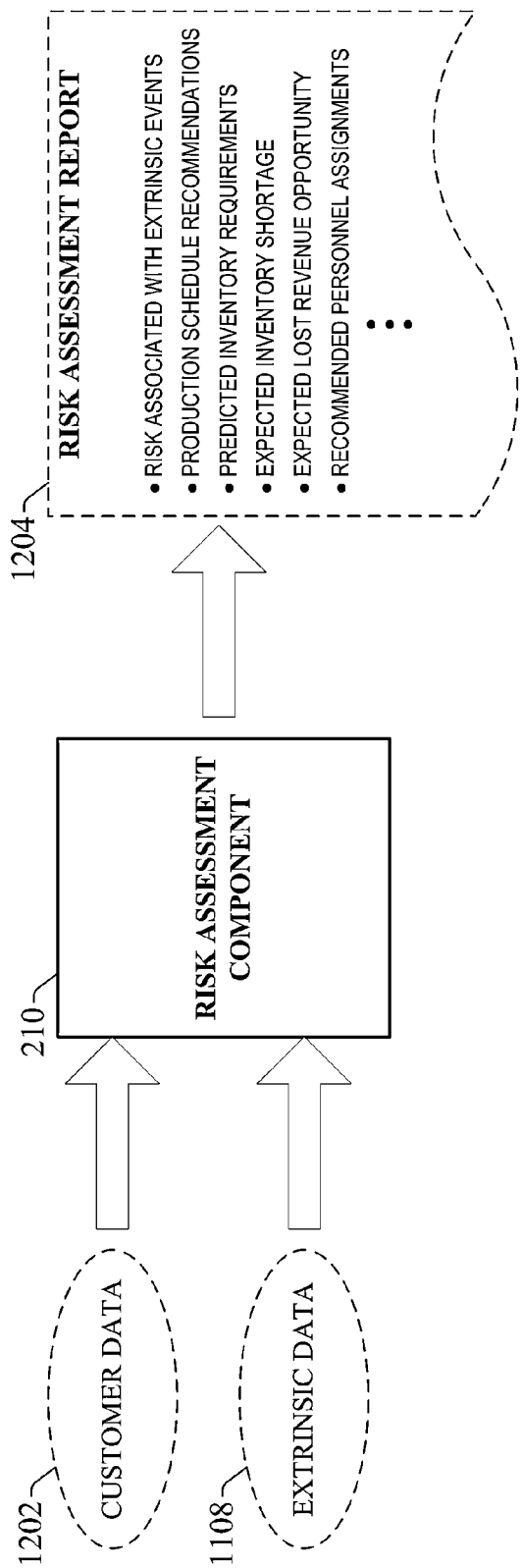
FIG. 15 illustrates generation of a risk assessment report based on analysis of customer data and extrinsic data by a cloud-based risk assessment system.

In the examples described above, the cloud-based risk assessment system provides risk assessment services by analyzing customer-specific data maintained in customer data stores 402, including device, process, asset, and system data collected from the customer's industrial systems and migrated to a cloud platform for analysis. As illustrated in FIG. 15, some embodiments of the risk assessment system can also leverage extrinsic data 1108 collected from sources external to the customer's industrial enterprise. Such extrinsic data 1108 can be used by risk assessment component 210 to identify risk factors that may be a partial function of events outside the industrial enterprise or supply chain. For example, extrinsic data 1108 may comprise, in part, current health statistics collected from a medical database. Based on analysis of this extrinsic data, risk assessment component 210 may identify an increase in reported influenza cases for a geographical location within a customer's retail area. Accordingly, risk assessment component 210 may predict an increase in demand for a relevant pharmaceutical product manufactured by the customer's pharmaceutical enterprise. Based on further analysis of customer data 1202 (e.g., device data 406, process data 408, asset data 410, and/or system data 412), risk assessment component 210 may determine that the current inventory level maintained by the customer may be insufficient to meet the expected elevated demand, and report this possible inventory shortage as a risk factor via risk assessment report 1204 (which may also include a recommendation to increase production of the pharmaceutical product to a level expected to satisfy the anticipated demand).

Extrinsic data 1108 may also include security-related information, including but not limited to network security alerts (e.g., Industrial Control Systems Cyber Emergency Response Team alerts) or zero-day vulnerability notifications. The risk assessment system can identify such security alerts, determine whether the reported risks apply to the customer's particular set of assets, and generate countermeasures for mitigating the security risks. In a related aspect, some embodiments of the risk assessment system can monitor statuses of anti-virus software and firewalls in use at the customer facility to determine the customer's current level of protection against software viruses or malware. The system can also estimate the possible impact on the customer's industrial assets in the event of a malware disruption (e.g., identification of which machines or devices will be impacted, estimate of lost revenue in the event of a malware attack, etc.)

In some embodiments, extrinsic data 1108 may also comprise human health or behavior data collected from plant personnel, which can be leveraged by the risk assessment system in various ways. Such data can be collected from personnel records (e.g., via cloud gateway that links a personnel database to the cloud platform), personal devices carried by the plant personnel and communicatively linked to the cloud platform, or other sources. According to such embodiments, risk assessment component 210 can leverage plant personnel data to identify potential risks associated with operator health, experience, skill levels, etc. For example, based on extrinsic data 1108 collected from a plant personnel database, together with customer data 1202 that models the customer's plant environment (including critical processes), risk assessment component 210 may determine that a relatively inexperienced machine operator has been assigned responsibility for a crucial production area, and report this personnel assignment as a possible risk factor. Determination of the operator's experience level may be based in part on the amount of time the operator has been employed, a recorded experience history for the operator, or other such considerations learned by examination of extrinsic data 1108. Risk assessment component 210 may further identify possible replacement operators having experience levels more suited to the critical production area, and generate a recommendation to replace the currently assigned operator with one of these more experienced operators as a risk aversion strategy.

In another example, extrinsic data 1108 may comprise biometric data collected from respective plant operators; e.g., via personal devices carried by each operator. Such devices may monitor certain biometric data for each operator, including but not limited to heart rate, perspiration, or other such health indicators. By monitoring this data over time, risk assessment component 210 can establish a baseline for biorhythmic clues for each operator. For example, risk assessment component 210 may determine each operator's normal heart rate by monitoring heart rate data over time. Once established, risk assessment component 210 may perform near real-time risk assessment by monitoring each user's heart rate in the cloud platform during production, and determine if an operator's heart rate falls outside a tolerance window defined by the baseline previously determined for that operator. In response to such a determination, risk assessment component 210 may generate a risk notification that the operator should be taken off the production line for health reasons. The system may also consider such factors as whether the operator has a known heart condition, whether the operator is known to exercise regularly, etc.

Embodiments of the cloud-based risk assessment system described herein can be designed to provide risk assessment reports on demand according to the techniques described above. The resulting one-time risk assessment reports can be used by the customer to identify risk factors at a high degree of granularity, and to implement risk aversion strategies recommended by the system. Such reports can also be used for insurance purposes by quantifying an overall degree of risk inherent in a customer's industrial enterprise. In some embodiments, the cloud-based risk assessment system may also monitor a customer's risk factors substantially in real-time in order to provide near real-time risk notifications. In some scenarios, this real-time risk monitoring can be provided to customers as a subscription service. When operating in real-time risk monitoring mode, the risk assessment system can deliver notifications to client devices associated with selected plant personnel (specified in customer model 404) in response to detection of a newly discovered risk factor. Such notifications can comprise reports similar to the risk assessment reports described above, or may comprise condensed versions of such reports identifying the newly discovered risk factor, the affected areas, and one or more risk mitigation strategies. Example risk notifications can include notifications of an impending device or asset failure, notifications that certain measured system variables indicate possible impending performance degradation, alerts that new firmware revisions are available for a given device, or other such alerts.

The risk assessment system can deliver such real-time risk notifications in accordance with notification preferences specified in customer model 404. These notification preferences can be defined as a function of the type of risk for which a notification is to be generated. For example, customer model 404 may specify that notifications relating to possible device failure or device compatibility issues should be delivered to one or more client devices associated with selected maintenance personnel, while notifications relating to non-optimal firmware versions or recommended device reconfigurations should be delivered to a client device associated with a plant engineer. Notification preferences defined in the customer model 404 may also be a function of a particular plant facility, area, or workcell to which the notification relates. Once the appropriate client devices to be notified have been determined, the cloud-based risk assessment system can deliver risk notifications to the one or more notification destinations. The notifications can be sent to specified Internet-capable client devices, such as phones, tablet computers, desktop computers, or other suitable devices.

Figure 16:
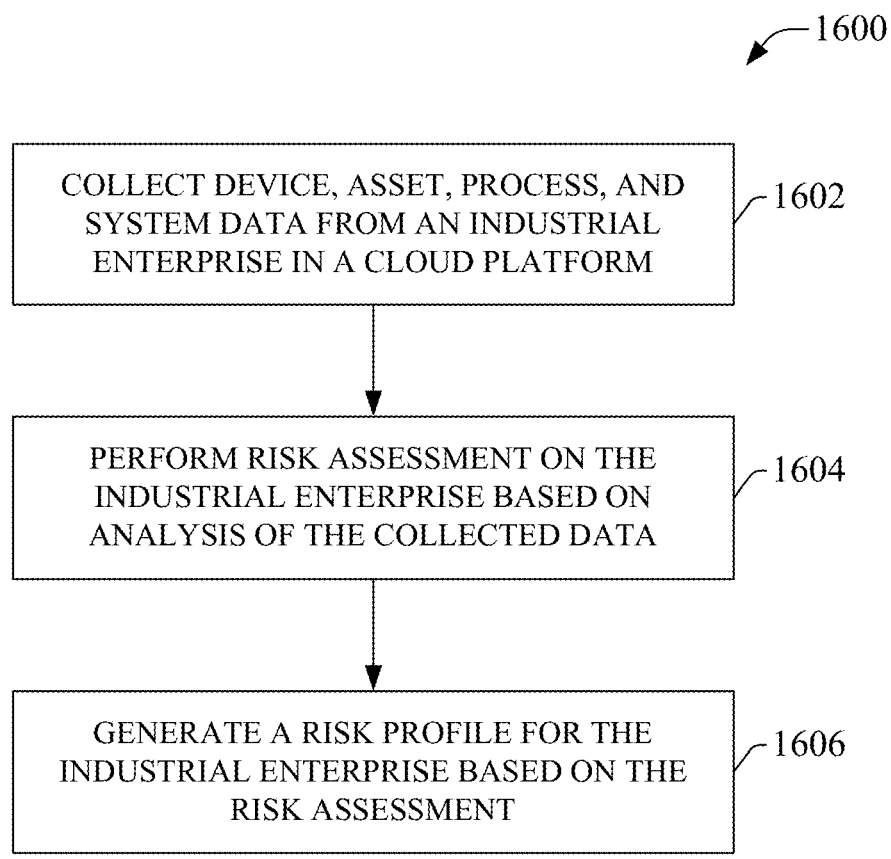
FIG. 16 is a flowchart of an example methodology for performing a risk assessment for an industrial enterprise using cloud-based services.
Figure 17:
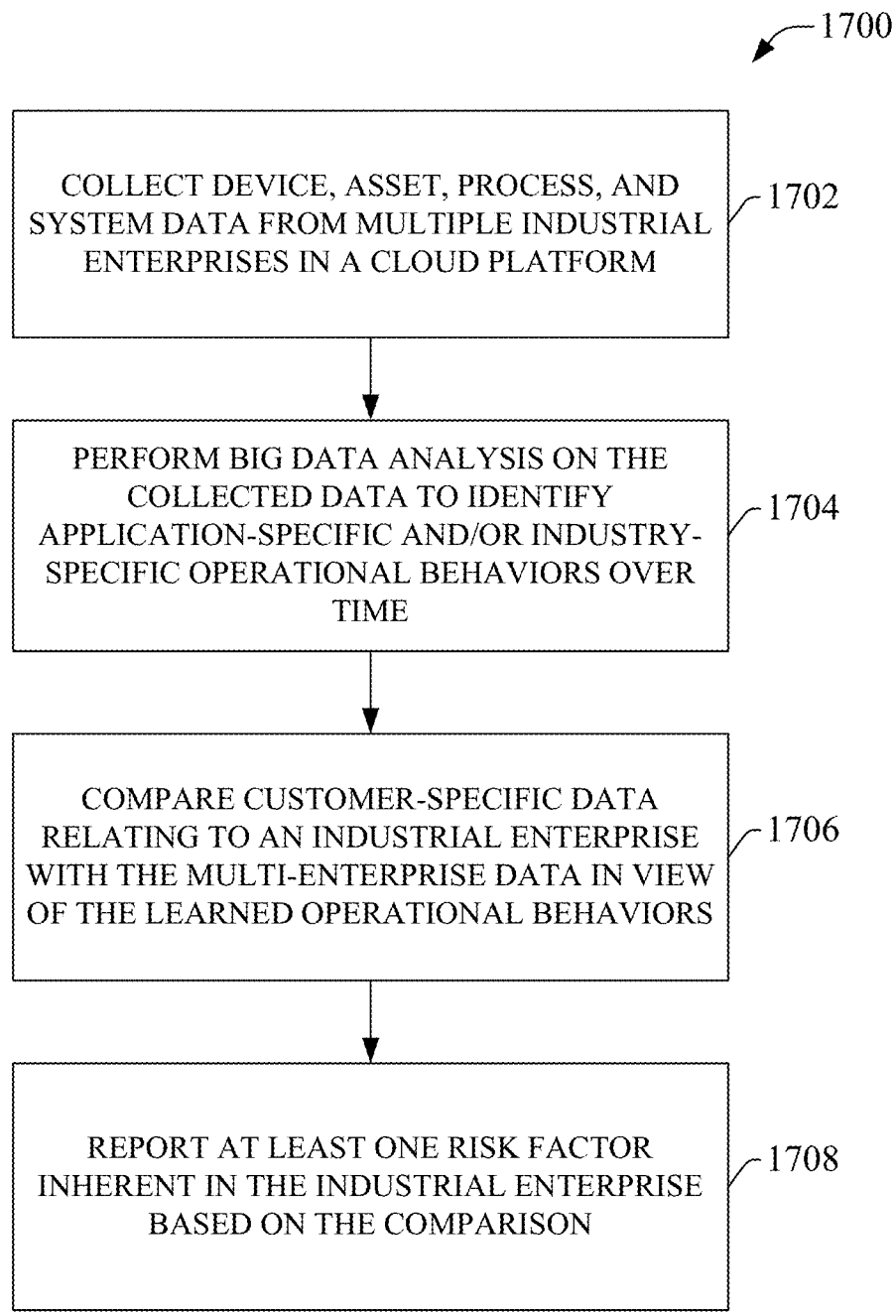
FIG. 17 is a flowchart of an example methodology for identifying inherent risk factors for an industrial system based on big data analysis performed in a cloud platform.
Figure 18:
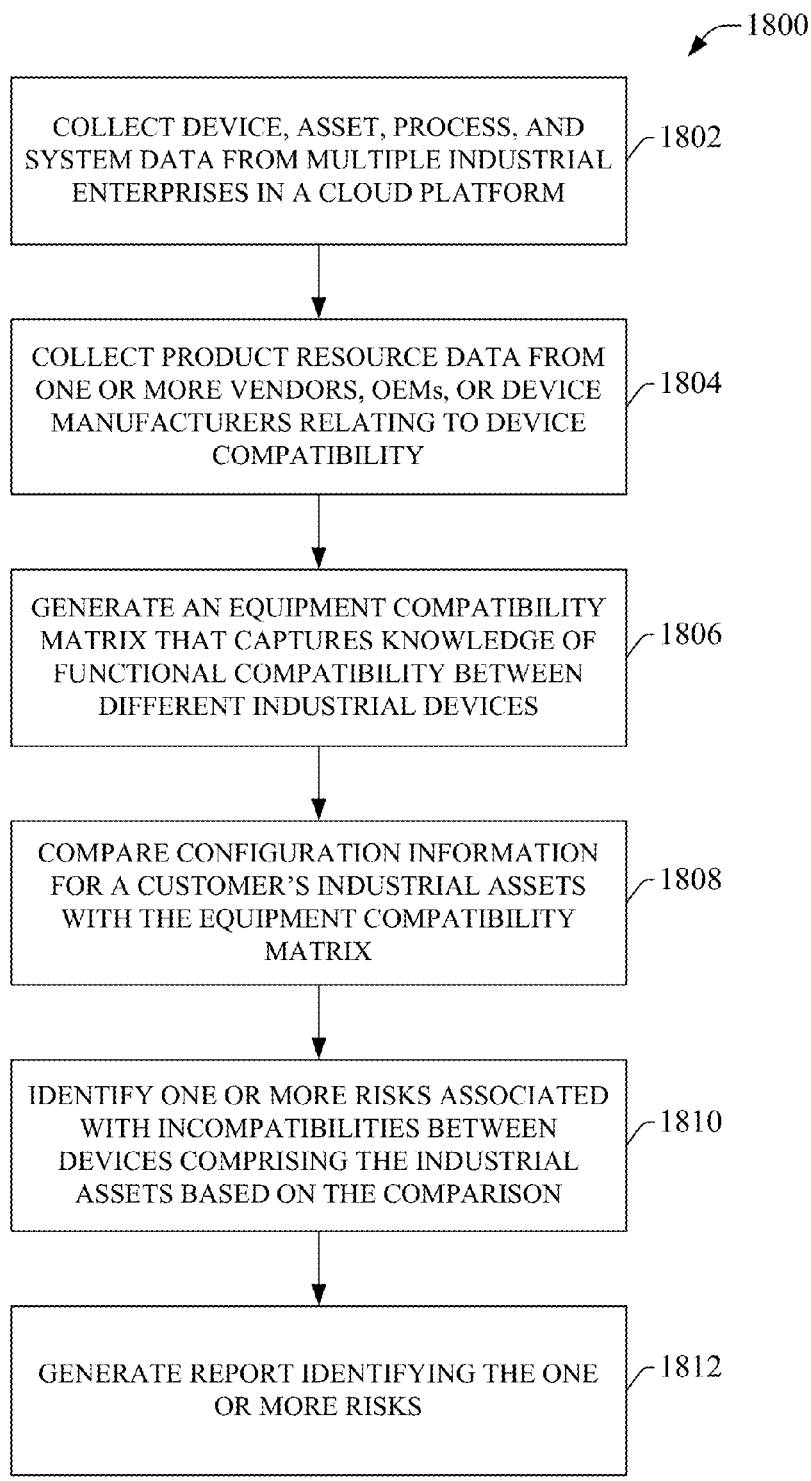
FIG. 18 is a flowchart of an example methodology for determining compatibility between two or more industrial devices using cloud-based analysis of industrial data.

FIGS. 16-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 16 illustrates an example methodology 1600 for performing a risk assessment for an industrial enterprise using cloud-based services. Initially, at 1602, data from an industrial enterprise is collected in a cloud platform. This data can comprise one or more of device, asset, process, and system data collected from plant-floor devices and assets, business-level systems (e.g., financial servers, ERP systems, etc.), supply chain entities that have a business relationship with the industrial enterprise, or other sources. As noted above, at least a portion of the industrial data can be collected via cloud gateways that reside on one or more industrial devices, or cloud gateway proxy devices that gather data from multiple industrial devices and migrate the gathered data to cloud storage on the cloud platform for analysis. In one or more embodiments, data collection services executing on the cloud platform can associate the collected data to a customer profile containing basic information about the industrial enterprise (e.g., customer model 404 of FIG. 4).

At 1604, risk assessment is performed on the collected data in the cloud platform. The risk assessment can identify production areas, processes, devices, or other aspects of the industrial enterprise, and identify risk factors associated with each aspect of the enterprise. Example risk factors can include short-term plant-level risks such as risk of machine downtime, equipment failure or non-optimal performance, or machine-related injuries, as well as medium- or long-term risks relating to order fulfillment, inventory, lost profit opportunities, etc. Risks associated with potential failures of plant network infrastructure devices (e.g., routers, switches, hubs, etc.) can also be identified.

At 1606, a risk profile for the industrial enterprise is generated based on the risk assessment. The risk profile can organize identified risks according to facility, production area, device, or other suitable classifications. The risk profile can also report a recommended strategy for reducing or mitigating one or more risks identified in the profile. The resulting risk profile can be generated on the cloud platform and delivered to one or more client devices associated with the industrial enterprise (e.g., via an Internet-based connection to the cloud platform).

FIG. 17 illustrates an example methodology 1700 for identifying inherent risk factors for an industrial system based on big data analysis performed in a cloud platform. Initially, at 1702, device, asset, process, and system data is collected from multiple industrial enterprises in a cloud platform. At 1704, big data analysis is performed on the collected data to identify application-specific and/or industry-specific operational behaviors over time. For example, performance metrics for certain industrial assets used by multiple industrial customers can be analyzed over time in order to learn performance trends as a function of device model, industrial application or context in which a device is used, device configuration or firmware version, or other such variables.

At 1706, customer-specific data relating to a particular industrial enterprise is compared with the multi-enterprise data in view of the learned operational behaviors identified in step 1704. The comparison is made in view of the analysis results obtained at 1704 to identify risk factors inherent in the customer's particular industrial systems. Such risk factors can be identified, for example, by noting deviations of the customer's device or asset configurations from configurations known to achieve reliable and successful results, as determined by the analysis performed at step 1704. Other risk factors relating to device obsolescence can also be identified by comparing a number of work cycles logged for a particular industrial asset with an expected total number of useful life cycles expected for that asset based on historical data collected from similar systems in use at other customer sites. At 1708, at least one identified risk factor is reported based on the analysis performed at step 1706. In some embodiments, the analysis and reporting sequence of steps 1704-1708 can be performed as part of an on-demand risk assessment request. Alternatively, the analysis and reporting sequence can be performed periodically to facilitate substantially real-time risk assessment monitoring.

FIG. 18 illustrates an example methodology 1800 for determining compatibility between two or more industrial devices using cloud-based analysis of industrial data. Initially, at 1802, data generated by industrial assets of multiple industrial enterprises is collected in a cloud platform. As described in previous examples, the collected data can comprise one or more of device, asset, process, and system data. At 1804, product resource data from one or more vendors, OEMs, or device manufacturers is also collected in the cloud platform. The product resource data can comprise information relating to specific industrial devices or other vendor products, which is collected and maintained in cloud-based storage. For a given device, product resource data can identify a product serial number, most recent firmware revision, preferred device configuration settings and/or software for a given type of industrial application, etc. At least a portion of the product resource data can also include known compatibility issues between certain devices. For example, if a vendor of a particular industrial control device becomes aware of an incompatibility between their product and a third-party device, the vendor may report this compatibility issue, which is recorded in the product resource data.

At 1806, an equipment compatibility matrix is generated based on analysis of the data collected at steps 1802 and 1804. The equipment compatibility matrix can capture knowledge of functional compatibility issues between different industrial devices. The compatibility matrix can identify compatibility issues as a function of one or more variable aspects, including but not limited to firmware version, industrial application, installed software, or other such variables.

At 1808 configuration information characterizing a particular customer's industrial assets is compared with the equipment compatibility matrix. The configuration information can be collected in the cloud-platform from any suitable data sources (e.g., the industrial devices comprising the assets, a customer database identifying devices in use and their relationship to one another, etc.), and can identify the assets in use at the customer's facilities, the communicative and/or functional relationships between the devices, the industrial application being carried out by the industrial assets, etc.

At 1810, one or more risks associated with device incompatibilities are identified based on the comparison made at step 1808. At 1812, a report is generated identifying the one or more risks. The report may optionally include corresponding risk aversion strategies for mitigating the risks associated with the identified device incompatibilities. For example, given an identified incompatibility between two devices, the report may identify an equivalent device that may be used as a replacement for one of the two incompatible devices, and which is more compatible with the other device (e.g., facilitates improved performance, enables a broader set of functions, etc.).

Figure 19:
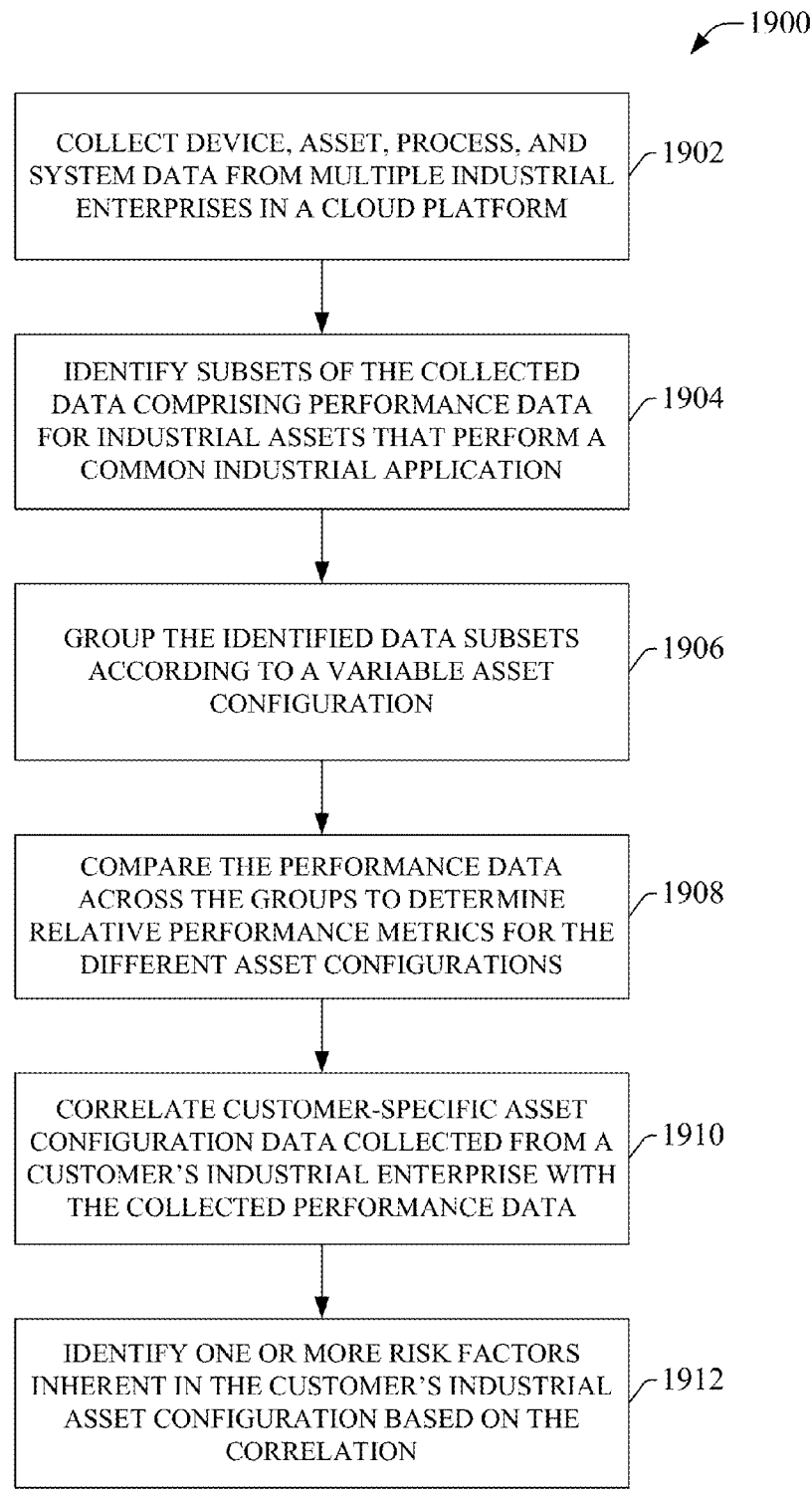
FIG. 19 is a flowchart of an example methodology for identifying risk factors inherent in a customer's industrial asset configuration based on comparative analysis with multi-enterprise data.

FIG. 19 illustrates an example methodology 1900 for identifying risk factors inherent in a customer's industrial asset configuration based on comparative analysis with multi-enterprise data. Initially, at 1902, industrial data is collected in a cloud platform from multiple industrial enterprises. The industrial data can comprise one or more of device, asset, process, and system data, as described in previous examples. At 1904, subsets of the collected data comprising performance data for industrial assets that perform a common industrial application are identified. For example, a cloud-based risk assessment system can identify subsets of the collected data corresponding to collections of industrial equipment that perform a particular batch process, where the respective subsets are collected from multiple industrial assets that perform the batch process but which comprise different sets of devices, device configurations, software code, etc.

At 1906, the identified data subsets are grouped according to a variable asset configuration. For example, the cloud-based risk assessment system can group together data subsets corresponding to industrial assets that include a particular device model, firmware version, network configuration, configuration parameter, or other variable configuration aspect. In this way, each data group represents performance data for the industrial application as a function of the variable configuration aspect.

At 1908, the performance data is compared across the groups established in step 1906, in order to determine relative performance metrics for the different asset configurations as a function of the variable configuration aspect. At 1910, customer-specific asset data collected from a particular customer's industrial enterprise is correlated with the collected performance data. For example, the customer-specific data can be cross-referenced with the performance data groups established at step 1906 in view of the performance comparisons made at step 1908. At 1912, one or more risk factors inherent in the customer's industrial asset configuration are identified based on the correlation of step 1910. For example, the cloud-based risk assessment system may determine, based on the customer-specific asset configuration data, that the customer's equipment configuration for performing the industrial application generally corresponds to the variable configuration aspect for one of the identified groups (step 1906), and is therefore expected to experience similar performance issues identified for that group based on the analysis performed at step 1908.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
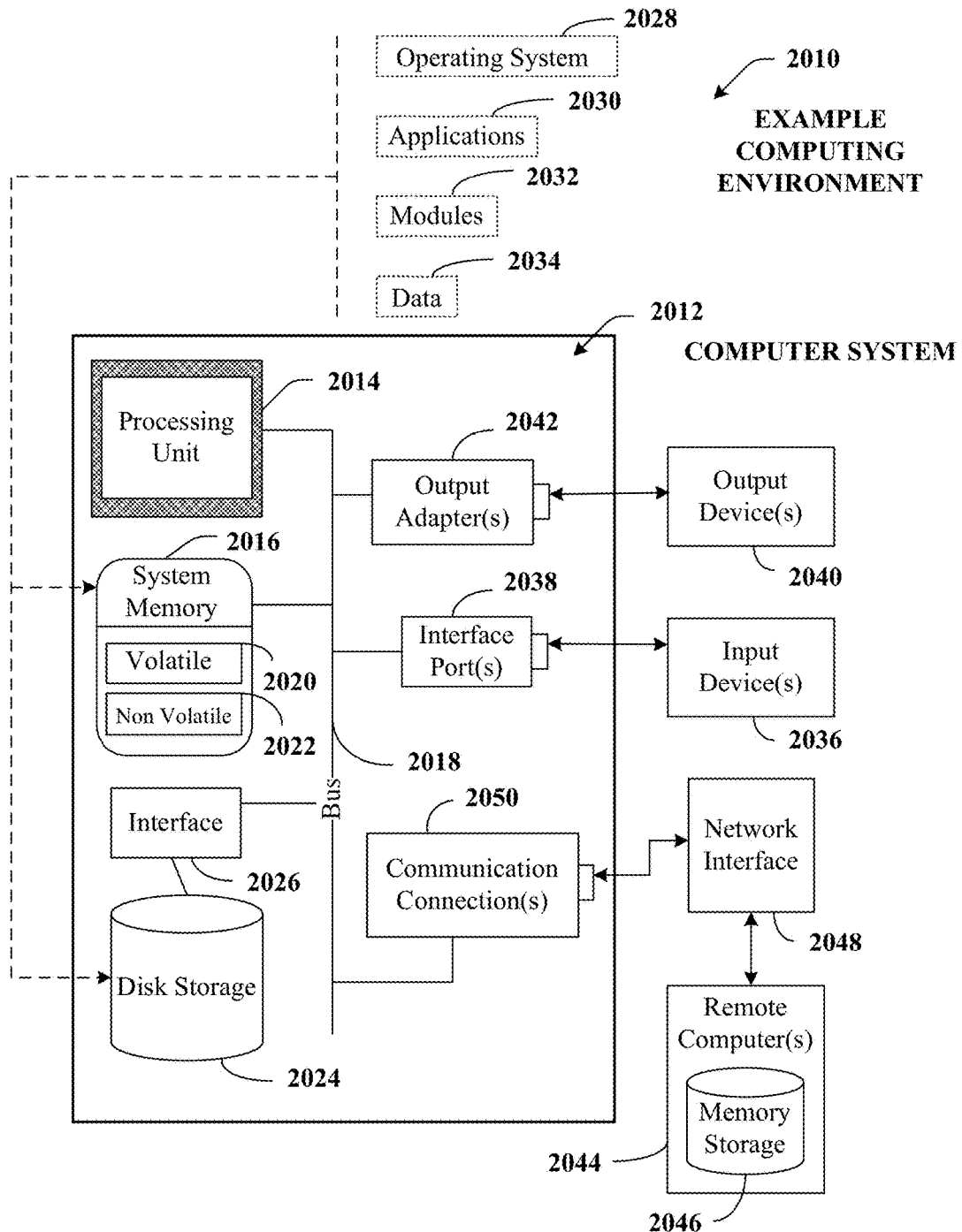
FIG. 20 is an example computing environment.
Figure 21:
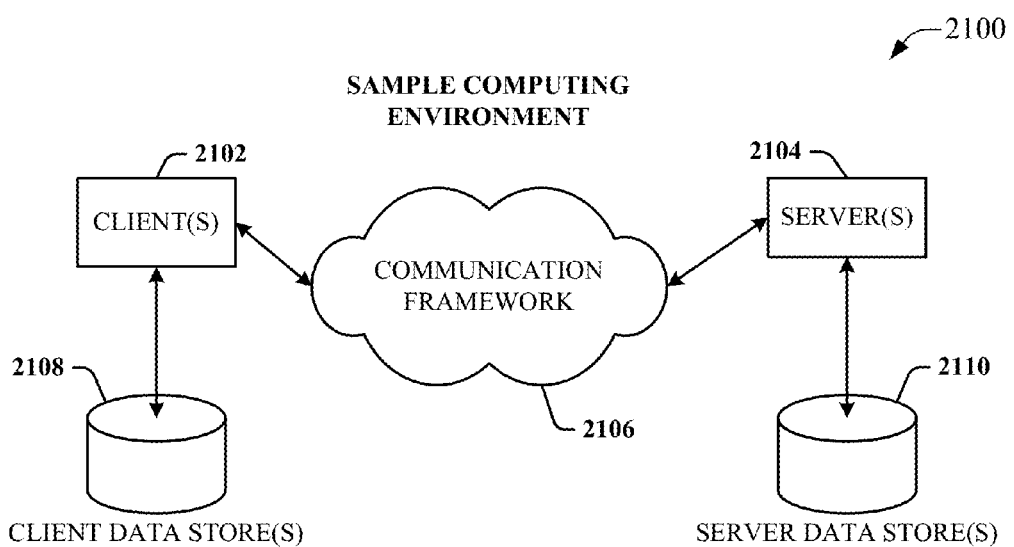
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented.

With reference to FIG. 20, an example environment 2010 for implementing various aspects of the aforementioned subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Multi-core microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable PROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/non-volatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer 2012. System applications 2030 take advantage of the management of resources by operating system 2028 through program modules 2032 and program data 2034 stored either in system memory 2016 or on disk storage 2024. It is to be appreciated that one or more embodiments of the subject disclosure can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapters 2042 are provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the system bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. Communication framework 2106 can comprise, for example, the cloud platform on which the various cloud-based services described above reside and execute. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for performing risk assessment on an industrial enterprise, comprising:
a memory that stores executable components;
a processor, operatively coupled to the memory, that executes executable components, the executable components comprising:
a device interface component configured to collect, via one or more wireless networks, data from a set of industrial devices of an industrial control system and store the data on a cloud platform, wherein the data comprises at least process data relating to an industrial process appended with device data identifying the industrial devices and customer data comprising a customer identifier of an industrial enterprise from which the data is collected;
a risk assessment component configured to
perform a collective analysis on the data and aggregated data stored on the cloud platform in association with one or more other customer identifiers of one or more other industrial enterprises,
identify, based on a result of the collective analysis and the data model, an operational trend as a function of an industry type, an industrial application type, and an industrial asset configuration, and
generate a risk profile identifying one or more risk factors for the industrial control system based on a data model of the industrial control system and a comparison of the data from the set of industrial control devices with the operational trend, wherein the one or more risk factors comprise at least a risk that data traffic through a network infrastructure device installed on a plant network at which the industrial control system resides will exceed a data traffic capacity of the network infrastructure device; and
a client interface component configured to send information contained in the risk profile to one or more client devices as risk assessment information, the risk assessment information rendering the one or more risk factors on the one or more client devices,
wherein the risk assessment component reconfigures the network infrastructure device to cause the network infrastructure device to redistribute the data traffic on the plant network based on identification of the risk that the data traffic will exceed the data traffic capacity.

2. The system of claim 1, wherein the device interface component is further configured to store the data on the cloud platform in association with the customer identifier associated with an owner of the industrial control system.

3. The system of claim 1, wherein the risk assessment component is further configured to generate risk aversion data specifying one or more risk aversion strategies for mitigating at least one of the one or more risk factors based on the result of the collective analysis.

4. The system of claim 1, wherein the device interface component is further configured to classify the data according to at least one of a device class, a process class, an asset class, or a system class.

5. The system of claim 1, wherein the device interface component is further configured to collect multi-enterprise data from a plurality of industrial enterprises associated with the one or more other customer identifiers and to store the multi-enterprise data on the cloud platform as the aggregated data.

6. The system of claim 5, wherein the risk assessment component is further configured to identify, based on the result of the collective analysis, the operational trend as a further function of at least one of an equipment type, an industrial device configuration setting, a firmware version, or a software version.

7. The system of claim 5, wherein the risk assessment component is further configured to generate an equipment compatibility matrix based on another result of the collective analysis, and identify the one or more risk factors based at least in part on a comparison of the data with the equipment compatibility matrix, wherein the equipment compatibility matrix records knowledge of compatibility between industrial devices.

8. The system of claim 5, wherein the device management component is configured to identify the one or more risk factors based on correlation of the data model with the aggregated data.

9. The system of claim 1, wherein the one or more risk factors further comprise at least one of a risk of device failure, a risk of degraded system performance, a risk of inventory shortage, a risk associated with loss of the network infrastructure device on the plant network, a risk of device incompatibility, or a risk of lost revenue opportunity.

10. The system of claim 1, wherein the risk assessment information is configured to cause the one or more client devices to render the one or more risk factors organized according to device-level risks and production-area-level risks.

11. A method for identifying risk factors in an industrial system, comprising:
collecting, by a system comprising at least one processor, industrial data from devices of an industrial automation system via one or more wireless networks;
associating, by the system, the industrial data with device data identifying the devices, and a customer identifier of an industrial enterprise associated with the industrial automation system, wherein the associating yields modified data;

storing, by the system, the modified data in cloud-based storage;

performing, by the system, a collective analysis on the modified data and aggregated data stored on the cloud platform, wherein the aggregated data is associated with one or more other customer identifiers of one or more other industrial enterprises, and wherein the performing comprises identifying, based on a result of the collective analysis, an operational trend as a function of an industry type, a type of industrial application, and a configuration of one or more of the devices;

determining, by the system, at least one risk factor inherent in the industrial automation system based on a data model of the industrial automation system and a comparison of the industrial data with the operational trend, the at least one risk factor comprising at least a risk that data traffic through a network infrastructure device installed on a plant network at which the industrial automation system resides will exceed a data traffic capacity of the network infrastructure device;

sending, by the system via at least one of the one or more wireless networks, report data identifying the at least one risk factor to a client device, wherein the report data causes the client device to render information about the at least one risk factor; and reconfiguring, by the system, the network infrastructure device to cause the network infrastructure device to redistribute the data traffic on the plant network based on identification of the risk that the data traffic will exceed the data traffic capacity.

12. The method of claim 11, wherein the storing comprises storing the modified data in association with a customer profile associated with the industrial enterprise.

13. The method of claim 11, further comprising:
determining, by the system based on the result of the collective analysis, at least one risk mitigation strategy predicted to reduce or eliminate the at least one risk factor; and
generating, by the system, the report data to identify the at least one risk factor and the at least one risk mitigation strategy.

14. The method of claim 11, wherein the determining the at least one risk factor further comprises determining at least one of a risk of device failure, a risk of degraded system performance, a risk of inventory shortage, a risk associated with loss of the network infrastructure device on the plant network, a risk of device incompatibility, or a risk of lost revenue opportunity.

15. The method of claim 11, further comprising
collecting, by the system as the aggregated data, multi-enterprise data from multiple industrial systems associated with respective industrial enterprises,
wherein the performing the collective analysis further comprises analyzing, by the system, the aggregated data to identify the operational trend as a further function of at least one of an equipment type, an industrial device configuration setting, a firmware version, or a software version.

16. The method of claim 11, further comprising:
generating, by the system, an equipment compatibility matrix based on another result of the collective analysis, wherein the equipment compatibility matrix records knowledge of compatibility between industrial devices; and
determining, by the system, the at least one risk factor based at least in part on a comparison of the industrial data with the equipment compatibility matrix.

17. The method of claim 11, wherein the report data causes the client device to render the information about the at least one risk factor organized according to device-level risks and production-area-level risks.

18. A non-transitory computer-readable medium having stored thereon executable instructions that, in response to execution, cause a computing system to perform operations, the operations comprising
collecting, via one or more wireless networks, industrial data from a first industrial asset associated with a first industrial enterprise;
storing the industrial data on a cloud platform in association with an identity of the first industrial asset and a first customer identifier of the first industrial enterprise;
collectively analyzing the industrial data with multi-enterprise data collected from one or more second industrial assets associated with respective one or more second industrial enterprises, the multi-enterprise data stored on the cloud platform in association with one or more second customer identifiers of the one or more second industrial enterprises;
identifying, based on a result of the collectively analyzing, an operational trend as a function of an industry type, an industrial application type, and an industrial asset configuration;
identifying one or more risk factors associated with the first industrial asset based on a data model associated with the first industrial enterprise and a comparison of the industrial data from the first industrial asset with the operational trend, wherein the identifying the one or more risk factors comprises identifying at least a risk that data traffic through a network infrastructure device of a plant network of the first industrial enterprise will exceed a data traffic capacity of the network infrastructure device;
rendering information relating to the one or more risk factors on a client device; and
in response to identification of the risk that the data traffic will exceed the data traffic capacity, reconfiguring the network infrastructure device to redistribute the data traffic on the plant network.

19. The non-transitory computer-readable medium of claim 18, wherein the information comprises a risk assessment report that identifies the one or more risk factors and one or more risk aversion strategies for reducing or eliminating the one or more risk factors.

20. The non-transitory computer-readable medium of claim 18, wherein the identifying the one or more risk factors further comprises identifying at least one of a risk of device failure, a risk of degraded system performance, a risk of inventory shortage, a risk associated with loss of a network infrastructure device on a plant network, a risk of device incompatibility, or a risk of lost revenue opportunity.

* * * * *